(12) United States Patent
Fujioka et al.

(10) Patent No.: US 7,722,121 B2
(45) Date of Patent: May 25, 2010

(54) RECLINING DEVICE

(75) Inventors: Hidehiko Fujioka, Fujisawa (JP);
Hiroshi Takayanagi, Fujisawa (JP);
Osamu Nagano, Fujisawa (JP);
Hiroyuki Suzuki, Fujisawa (JP)

(73) Assignee: Shiroki Kogyo Co., Ltd., Kanagawa (JP)

( * ) Notice: Subject to any disclaimer, the term of this patent is extended or adjusted under 35 U.S.C. 154(b) by 0 days.

(21) Appl. No.: 11/664,161

(22) PCT Filed: Oct. 27, 2005

(86) PCT No.: PCT/JP2005/019804

§ 371 (c)(1),
(2), (4) Date: Dec. 28, 2007

(87) PCT Pub. No.: WO2006/046653

PCT Pub. Date: May 4, 2006

(65) Prior Publication Data

US 2008/0093903 A1   Apr. 24, 2008

(30) Foreign Application Priority Data

| Oct. 29, 2004 | (JP) | ............................. 2004-316071 |
| Apr. 11, 2005 | (JP) | ............................. 2005-113716 |
| Apr. 11, 2005 | (JP) | ............................. 2005-113717 |
| Apr. 14, 2005 | (JP) | ............................. 2005-117156 |
| May 23, 2005 | (JP) | ............................. 2005-149174 |

(51) Int. Cl.
*B60N 2/235* (2006.01)
(52) U.S. Cl. ................................................. 297/367 L

(58) Field of Classification Search .................. 297/367, 297/378.12
See application file for complete search history.

(56) References Cited

U.S. PATENT DOCUMENTS

| 4,087,885 | A | * | 5/1978 | Gillentine | .................... 297/367 |
| 6,007,152 | A | * | 12/1999 | Kojima et al. | ................ 297/367 |
| 6,024,410 | A | * | 2/2000 | Yoshida | ................... 297/301.1 |
| 6,634,713 | B2 | * | 10/2003 | Nonomiya et al. | .......... 297/367 |

(Continued)

*Primary Examiner*—Peter R. Brown
(74) *Attorney, Agent, or Firm*—Finnegan, Henderson, Farabow, Garrett & Dunner, L.L.P.

(57) ABSTRACT

A reclining device capable of controlling angles of a seat back of a vehicle is provided. A ratchet plate is superposed on a base plate such that the ratchet plate is rotatable relative to the base plate. An operation shaft is rotatably disposed on the rotation center axis of the ratchet plate. A circular concavity is formed on a surface of the ratchet plate opposed to the base plate around the operation shaft. Inside teeth are provided on an inner circumferential wall surface of the concavity. Pawls having outside teeth on their front end surfaces are disposed on the concavity, and the outside teeth of the pawls engage with and disengaging from the inside teeth in the radial direction of a teeth end circle. Guide projections provided on the base plate slidingly guide the pawls in the radial direction. A cam disposed in a space on the side of rear end surfaces of the pawls is rotatable with the operation shaft. A release plate disposed between the ratchet plate and the components of the pawls and the cam such that the release plate is rotatable with the cam. Projections engaging with cam grooves are provided at the rotation end of the release plate to release engagement between the inside teeth and the outside teeth.

9 Claims, 22 Drawing Sheets

U.S. PATENT DOCUMENTS 6,726,281 B2 * 4/2004 Baloche ................. 297/367
6,749,263 B2 * 6/2004 Peters .................. 297/367
7,168,764 B2 * 1/2007 Reubeuze et al. ......... 297/367
2002/0033627 A1 * 3/2002 Hoshihara et al. ........ 297/367
2002/0096925 A1 * 7/2002 Uramichi ............... 297/367
2003/0184143 A1 10/2003 Cilliere et al.

* cited by examiner

PRIOR ART

PRIOR ART

PRIOR ART

PRIOR ART

RECLINING DEVICE

TECHNICAL FIELD

The present invention relates to a reclining device for controlling angles of a seat back of a vehicle. More particularly, the invention relates to a reclining device having a ratchet plate superposed on a base plate such that the ratchet plate is rotatable relative to the base plate, an operation shaft positioned on a rotation center axis of the ratchet plate, and a mechanism interposed between the ratchet plate and the base plate for adjusting the relative rotational positions of the ratchet and base plates in accordance with desired angles.

BACKGROUND ART

A known reclining device of this type has a structure shown in FIGS. 1 through 3, for example. In these figures, a base plate 1 is fixed to a lower arm of a seat cushion, and a ratchet plate 5 is fixed to an upper arm of a seat back.

The ratchet plate 5 is superposed on the base plate 1 such that the ratchet plate 5 can rotate relative to the base plate 1. An operation shaft 3 positioned on the rotation center axis of the ratchet plate 5 is rotatably supported by the base plate 1 and the ratchet plate 5. A circular concavity is formed on a surface of the ratchet plate 5 opposed to the base plate 1 around the operation shaft 3. Inside teeth 7 are provided on the inner circumferential wall surface of the concavity.

Pawls 11 are provided on the concavity of the ratchet plate 5. Each of the pawls 11 has outside teeth 9 on its front end surface to engage with and disengage from the inside teeth 7 in the radial direction of the tooth end circle. Guide projections 13 and 13' for slidingly guiding the pawls 11 in the radial direction are equipped on the base plate 1.

A cam 15 is attached to the operation shaft 3 such that the cam 15 rotates with the operation shaft 3 as one piece. The cam 15 is disposed in a space on the side of the rear end surfaces of the pawls 11. The cam 15 pushes the backs of the pawls 11 to bring the outside teeth 9 of the pawls 11 into engagement with the inside teeth 7 of the ratchet plate 5. The cam 15 engages with outer ends of spiral springs 17 engaging with the base plate 1. The spiral springs 17 urge the cam 15 in the direction of engagement between the outside teeth 9 of the pawls 11 and the inside teeth 7 of the ratchet plate 5 (locking direction).

A portion of the operation shaft 3 having an elliptical cross section is inserted through a disk-shaped release plate 21 and the cam 15. The release plate 21 is superposed on the cam 15, the pawls 11, and the guide projections 13 and 13' in such a position as to contact one side of these components. Convexes 15a formed on the cam 15 engage with holes 21a of the release plate 21 such that the release plate 21 and the cam 15 can rotate as one piece.

Projections 11a formed on the surfaces of the pawls 11 facing to the ratchet plate 5 engage with cam grooves 21b formed on the release plate 21. The shapes of the cam grooves 21b are so determined that the cam grooves 21b shift the pawls 11 in such directions where the outside teeth 9 of the pawls 11 move away from the inside teeth 7 of the ratchet plate 5 when the release plate 21 rotates anticlockwise in FIG. 1 (for example, see Patent Reference No. 1).

Another example of known reclining device has a mechanism for separating outside teeth of pawls from inside teeth of a ratchet plate without using the release plate by a structure shown in FIG. 4. Similarly to the above example, pawls 33 are disposed between a base plate 41 and a ratchet plate 37 as apparent from the figure. The pawls 33 are guided by guide projections 45 and 45' formed on the base plate 41 in the radial direction such that outside teeth 35 of the pawls 33 engage with and disengage from inside teeth 39 of the ratchet plate 37.

In this related-art example, grooves 33a are formed at the back of the pawls 33, and arms 31a engaging with the grooves 33a of the pawls 33 are equipped on the cam 31. In the unlocking operation, the cam 31 is rotated anticlockwise in FIG. 4. By this rotation, the outside teeth 35 of the pawls 33 are shifted in the direction where the outside teeth 35 of the pawls 33 move away from the inside teeth 39 of the ratchet plate 37 (for example, see Patent Reference No. 2).

Patent Reference No. 1: JP-A-2001-87071

Patent Reference No. 2: JP-A-2001-87069

Patent Reference No. 3: JP-A-2004-105637

Patent Reference No. 4: Japanese Patent No. 3,115,231

Patent Reference No. 5: JP-A-2002-34695

Patent Reference No. 6: JP-A-2003-180478

DISCLOSURE OF THE INVENTION

Problems that the Invention is to Solve

The reclining device shown in FIGS. 1 through 3 and the reclining device shown in FIG. 4 have the following problems.

(1) Reclining device shown in FIGS. 1 through 3

Forces given from the inside teeth 7 of the ratchet plate 5 to the outside teeth 9 of the pawls 11 via an engagement area K (see FIG. 2) therebetween act on the central portions of the pawls 11 in the plate thickness direction. On the other hand, forces given from the side wall surfaces of the cam grooves 21b of the release plate 21 to the projections 11a of the pawls 11 via the contact area therebetween act on positions shifted from the surfaces of the pawls 11 in the plate thickness direction (axial direction of the operation shaft 3).

Thus, a moment in the direction of M (see FIG. 2) for tilting the pawls 11 in the plate thickness direction is generated at the time of rotation of the release plate 21 for separating the outside teeth 9 of the pawls 11 from the inside teeth 7 of the ratchet plate 5 in the unlocking operation. This moment M deteriorates maneuverability of the reclining device at the time of the unlocking operation.

(2) Reclining device shown in FIG. 4

Forces given from the arms 31a of the cam 31 to the grooves 33a of the pawls 33 act on the central portions of the pawls 33 in the plate thickness direction. Thus, the moment M discussed above is not generated.

The guide projections 45, 45' provided on the reclining device of this type slidingly guide the pawls 33, and also rigidly support the pawls 33 such that separation of the engagement between the outside teeth 35 of the pawls 33 and the inside teeth 39 of the ratchet plate 37 is prevented when rotational load is applied to the ratchet plate 37 at the time of collision of the vehicle or for other reasons. Thus, the guide projections 45, 45' are required to have a predetermined strength.

According to the structure shown in FIG. 4, however, the guide projection 45' of the pair of the guide projections 45 and 45' is smaller than the guide projection 45 so as to avoid interference with the arm 31a of the cam 31. In this structure, it is difficult to secure the predetermined strength of the guide projection 45'.

The invention has been developed to solve the above problems. It is an object of the invention to provide a reclining device capable of improving maneuverability in unlocking operation and securing sufficient strength of guide projections.

Means for Solving the Problems

A reclining device which solves the above problems according to the invention includes: a base plate; a ratchet plate superposed on the base plate such that the ratchet plate is rotatable relative to the base plate; an operation shaft rotatably disposed on the rotation center axis of the ratchet plate; a circular concavity formed on a surface of the ratchet plate opposed to the base plate around the operation shaft; inside teeth provided on an inner circumferential wall surface of the concavity; pawls disposed on the concavity and provided with outside teeth on front end surfaces of the pawls, the outside teeth engaging with and disengaging from the inside teeth in the radial direction of a teeth end circle; guide projections provided on the base plate for slidingly guiding the pawls in the radial direction; a cam disposed in a space on the side of rear end surfaces of the pawls and rotatable with the operation shaft to press the rear end surfaces of the pawls; urging means for urging the cam in the direction where the outside teeth of the pawls engage with the inside teeth of the ratchet plate; cam grooves formed on the pawls and open at least to the ratchet plate; and a release plate disposed between the ratchet plate and the components of the pawls and the cam such that the release plate is rotatable with the cam. Projections engaging with the cam grooves are provided on the rotation end of the release plate. When the operation shaft is rotated against urging force produced by the urging means, the release plate forces the pawls to shift toward the rotation center of the cam by the interaction of the cam grooves and the projections such that the outside teeth of the pawls are separated from the inside teeth of the ratchet plate.

According to the invention, a force given from the projections of the release plate to the cam grooves of the pawls via the contacting positions therebetween acts on the central portions of the pawls in the plate thickness direction. Thus, in the unlocking operation for rotating the release plate and separating the outside teeth of the pawls from the inside teeth of the ratchet plate, no moment for tilting the pawls in the plate thickness direction is not generated.

The reclining device according to the invention is further characterized in that the outside teeth disposed on the pawls in the width direction are so shaped that the outside teeth positioned in the central area are negatively transformed from the outside teeth positioned at both ends in the above reclining device.

According to the invention, since the outside teeth positioned in the central area of the pawls in the width direction (pitch circle direction) are negatively transformed from the outside teeth positioned at both ends, the thickness of the outside teeth positioned in the central area is reduced on the pitch circle of the outside teeth positioned at both ends and therefore the outside teeth in the central area can engage with the inside teeth of the ratchet plate without interference therebetween. Thus, the outside teeth positioned at both ends deeply engage with the inside teeth of the ratchet plate with no clearance between the outside teeth at both ends and the inside teeth at the time of locking. In the locked condition where the outside teeth at both ends firmly engage with the inside teeth, tilting of the pawls is reduced when load is applied from the ratchet plate to the pawls via the inside teeth. Thus, engagement margin is not greatly decreased.

The reclining device is further characterized in that no concavity is formed on the back surfaces of the guide projections provided on the base plate so as to increase the strength of the guide projections in the reclining device.

The reclining device is further characterized in that: the cam has inclined cam surfaces for pressing the rear end surfaces of the pawls such that the outside teeth of the pawls engage with the inside teeth of the ratchet plate at the time of rotation of the cam; the cam has supporting surfaces which are disposed at least either before or behind the inclined cam surfaces in the direction of rotation of the cam caused by the urging means and are opposed to the ends of the rear end surfaces of the pawls at the time of engagement between the outside teeth of the pawls and the inside teeth of the ratchet plate so as to support the ends of the rear end surfaces of the pawls when load is applied from the ratchet plate to the pawls in the direction of rotation; the supporting surfaces include first inclined surfaces inclined in the same directions as the directions of the inclined cam surfaces and second inclined surfaces inclined in the directions opposite to the directions of the inclined cam surfaces; and first projections capable of contacting the first inclined surfaces and second projections capable of contacting the second inclined surfaces are provided on the ends of the rear end surfaces of the pawls in the reclining device.

According to the invention, the cam having received the urging force of the urging means rotates in the direction where the outside teeth of the pawls are brought into engagement with the inside teeth of the ratchet plate. As a result, the inclined cam surfaces of the cam press the rear end surfaces of the pawls, and the pawls move in the radial direction where the outside teeth of the pawls engage with the inside teeth of the ratchet plate. During the movement of the pawls, the first projections as a part of the pawls also shift in the same directions away from the rotation center of the cam. Simultaneously, the first inclined surfaces of the cam move in accordance with the rotation of the cam in such directions as to follow and approach the first projections of the pawls when the first inclined surfaces of the cam are viewed from the first projections of the pawls. Thus, the clearances between the first projections of the pawls and the first inclined surfaces of the cam are not excessively increased.

When load is applied from the ratchet plate to the pawls at the time of collision of the vehicle or for other reasons in the locked condition where the outside teeth of the pawls engage with the inside teeth of the ratchet plate, the pawls are slightly inclined. As a result, the first projections of the pawls contact the first inclined surfaces of the cam, and the second projections of the pawls contact the second inclined surfaces of the cam. Thus, the pawls are now supported by the three components of the inclined cam surfaces and the first and second inclined surfaces of the cam.

When load is applied from the ratchet plate to the pawls, contact pressure is given to the contact surfaces between the first inclined surfaces of the cam and the first projections of the pawls in the common normal direction of the contact surfaces. Since the first inclined surfaces inclined in the same directions as those of the inclined cam surfaces are formed, component forces pressing the cam backward in the unlocking direction act on the cam.

On the other hand, the second inclined surfaces inclined in the directions opposite to the directions of the inclined cam surfaces are formed, component forces rotating the cam in the locking direction act on the cam. As a result, the forces pressing the cam backward in the unlocking direction generated by the presence of the first inclined surfaces are cancelled or reduced by the forces in the opposite directions generated by the presence of the second inclined surfaces. Accordingly, the reclining unit does not come to the unlocked condition.

There is a possibility that the second inclined surfaces of the cam do not contact the second projections in the locking operation. In this case, if the cam reversely rotates, the cam stops when the second projections of the pawls contact the second inclined surfaces of the cam. This is because the component forces for rotating the cam in the locking direction are generated due to the presence of the second inclined surfaces at the time of contact between the second projections of the pawls and the second inclined surfaces of the cam.

The reclining device is further characterized in that the shapes of the inclined cam surfaces and the first inclined surfaces of the cam are so determined that clearances between the first inclined surfaces of the cam and the first projections of the pawls are kept constant before and behind the engagement positions of the outside teeth of the pawls and the inside teeth of the ratchet plate in the reclining device.

The reclining device is further characterized in that pawl stopper surfaces of the pawls drawn to the rotation center of the cam contact cam stopper surfaces of the cam to prevent further rotation of the cam when the cam is rotated such that the outside teeth of the pawls are separated from the inside teeth of the ratchet plate in the reclining device.

According to the invention, in the normal condition, the cam is rotated by the urging force produced by the urging means to press the rear end surfaces of the pawls. As a result, the outside teeth of the pawls are brought into engagement with the inside teeth of the ratchet plate, and the relative rotation of the base plate and the ratchet plate is prevented in the locked condition.

In this condition, when the operation shaft is rotated against the urging force of the urging means to rotate the cam and release plate, the release plate forces the pawls to move toward the rotation center of the cam. As a result, the outside teeth of the pawls are separated from the inside teeth of the ratchet plate, and the locking condition of the reclining device is released.

When the cam further rotates, the cam stopper surfaces come into contact with the pawl stopper surfaces of the pawls. Thus, further rotation of the cam, i.e., rotation of the operation shaft is prevented.

The reclining device is further characterized in that: a 1'st flat surface extending in parallel with the rotation center axis of the operation shaft is formed on the outer circumferential surface of the operation shaft; a through hole through which the operation shaft is inserted leaving play is provided on the cam, a first flat surface which extends in parallel with the rotation center axis of the cam being formed on the inner circumferential surface of the through hole; and an elastic force generating member which contacts the inner circumferential surface of the through hole and the outer circumferential surface of the operation shaft with pressure to bring the first flat surface of the through hole of the cam and the 1'st flat surface of the operation shaft into contact with each other is provided between the inner circumferential surface of the through hole of the cam and the outer circumferential surface of the operation shaft inserted through the through hole leaving play in the reclining device.

The reclining device is further characterized in that the elastic force generating member includes: a holding unit attached to an area of the outer circumferential surface of the operation shaft other than a portion opposed to the inner circumferential surface of the through hole of the cam; and an elastic force generating unit disposed next to the holding unit for contacting the inner circumferential surface of the through hole of the cam and the outer circumferential surface of the operation shaft with pressure in the reclining device.

The reclining device is further characterized in that: the through hole of the cam has an elliptical cross section having the first flat surface and a second flat surface parallel with the first flat surface on the inner circumferential surface; the operation shaft has an elliptical cross section having the 1'st flat surface and a 2'nd flat surface parallel with the 1'st flat surface on the outer circumferential surface; the first flat surface of the cam has a first groove extending along the rotation center axis of the cam, and the second flat surface has a second groove extending along the rotation center axis of the cam; the holding unit of the elastic force generating member has a base section opposed to a circumferential surface between the 1'st flat surface and the 2'nd flat surface of the operation shaft, a first contact section provided next to one end of the base section for contacting the 1'st flat surface of the operation shaft with pressure, and a second contact section provided next to the other end of the base section for contacting the 2'nd flat surface of the operation shaft with pressure; the first contacting section has a first guide projection which is inserted into the first groove and has a shape whose width in the width direction of the first groove is gradually decreased; and the second contacting section has a second guide projection which is inserted into the second groove while contacting the 2'nd flat surface of the operation shaft with pressure and has a shape whose width in the width direction of the second groove is gradually decreased, and a spring section which is inserted into the second groove and contacts the bottom surface of the second groove with pressure so as to bring the first flat surface of the through hole of the cam and the 1'st flat surface of the operation shaft into contact with each other in cooperation with the second guide projection in the reclining device.

Advantage of the Invention

According to the invention, no moments for inclining the pawls in the plate thickness direction are generated at the time of unlocking operation. Thus, maneuverability of the reclining device in the unlocking operation is improved. Moreover, since no interference between the cam and guide projections is caused, there is no necessity for reducing the size of the guide projections. Accordingly, sufficient strength of the guide projections can be secured.

According to the invention, since the outside teeth provided in the central portions of the pawls engage with the inside teeth of the ratchet plate without interference therebetween, the outside teeth provided at both ends deeply engage with the inside teeth of the ratchet plate in the locked condition without producing clearance between the outside teeth provided at both ends and the inside teeth of the ratchet plate. Thus, in the locked condition where the outside teeth at both ends firmly engage with the inside teeth, tilting of the pawls is reduced when load is applied from the ratchet plate to the pawls via the inside teeth. Accordingly, stable and large locking strength can be offered without considerable decrease in engagement margin.

According to the invention, since no concavities are formed on the back surfaces of the guide projections provided on the base plate, the strength of the guide projections is increased with no deformation or the like of the guide projections caused. Thus, tilting of the pawls is reduced and stable and large locking strength is offered.

According to the invention, at the time of movement of the pawls in the locking direction, the first projections as a part of the pawls also shift in the same directions away from the rotation center of the cam. Simultaneously, the first inclined surfaces of the cam move in accordance with the rotation of the cam in such directions as to follow and approach the first projections of the pawls when the first inclined surfaces of the cam are viewed from the first projections of the pawls. Thus, the clearances between the first projections of the pawls and the first inclined surfaces of the cam are not excessively increased. Accordingly, stable and large locking strength can be offered without great decrease in the degree of locking strength.

When load is applied from the ratchet plate to the pawls, component forces pressing the cam backward in the unlocking direction act on the cam. However, since the second inclined surfaces inclined in the directions opposite to the directions of the inclined cam surfaces are provided, component forces for rotating the cam in the locking direction also act on the cam. As a result, the forces for pressing the cam backward in the unlocking direction generated by the presence of the first inclined surfaces are cancelled or reduced by the forces in the opposite directions generated by the presence of the second inclined surfaces. Accordingly, the reclining unit does not come to the unlocked condition, and therefore large locking strength can be offered in this aspect.

According to the invention, since the clearances between the first inclined surfaces of the cam and the first projections of the pawls are kept constant before and behind the engagement positions of the outside teeth of the pawls and the inside teeth of the ratchet plate, the locking strength does not considerably vary even when the engagement positions are shifted from the normal target positions by the presence of component tolerances.

According to the invention, the cam stopper surfaces and the pawl stopper surfaces formed on the cam and pawls come into contact with each other when the outside teeth of the pawls are separated from the inside teeth of the ratchet plate to prevent further rotation of the cam. In this structure, the unlocking operation ends when the cam stopper surfaces contact the pawl stopper surfaces. The operation force for unlocking is transmitted from the operation shaft to the cam. Thus, the clearance between the operation shaft and the cam is only the factor for the variances in the rotation of the operation shaft in the unlocking operation, and therefore the angle through which the operation shaft is rotated in the unlocking operation, i.e., the operation stroke in the unlocking operation is smaller than that in the related-art reclining device.

The base plate on which the cam, the pawls, and the guide projections for guiding the pawls are provided has a large strength such that the reclining device obtains sufficient locking strength in the locked condition. The unlocking operation ends when the cam stopper surfaces of the cam contact the pawl stopper surfaces of the pawls. Since the cam and the pawls having large strength contact with each other, the release means is not required to have large strength even when large unlocking operation force is applied. Accordingly, the necessary cost is reduced.

According to the invention, the first flat surface is formed on the through hole of the cam, and the 1'st flat surface is formed on the operation shaft. In addition, the elastic force generating member for bringing both the flat surfaces into contact with each other is equipped. In this structure, the rotation center axis of the operation shaft coincides with the rotation center axis of the cam, and thus maneuverability of the reclining device at the time of operation can be enhanced.

According to the invention, the elastic force generating member includes the holding unit attached to an area of the outer circumferential surface of the operation shaft other than a portion opposed to the inner circumferential surface of the through hole of the cam. In attaching the elastic force generating member, the holding unit is temporarily retained by the operation shaft, and then the elastic force generating member is shifted along the rotation center axis of the operation shaft. Thus, the elastic force generating unit can be easily inserted into the space between the inner circumferential surface of the through hole of the cam and the outer circumferential surface of the operation shaft.

According to the invention, the holding unit of the elastic force generating member is temporarily retained by the operation shaft, and then the elastic force generating member is shifted along the operation shaft. As a result, the first guide of the first contact section is inserted into the first groove, and the second guide of the second contact section is inserted into the second groove. Since the first guide and the second guide have shapes whose widths in the width direction of the first and second grooves are gradually decreased to the distal ends, a force for shifting the base section of the holding unit toward the outer circumferential surface of the operation shaft is given to the elastic force generating member when the first and second guides slidingly contact the side wall surfaces of the first and second grooves.

By the contact between the base section of the holding unit and the outer circumferential surface of the operation shaft, the cam and the operation shaft can be positioned in the direction parallel with the first flat surface on the plane parallel with the rotation plane of the cam.

According to the invention, the cam and the operation shaft can be positioned in the direction parallel with the first flat surface on the plane parallel with the rotation plane of the cam. Accordingly, the rotation center axis of the operation shaft coincides with the rotation center axis of the cam, and thus maneuverability of the reclining device at the time of operation can be further enhanced.

BRIEF DESCRIPTION OF THE DRAWINGS

FIG. 22(A) is a front view, FIG. 22(B) is a left side view, FIG. 22 (C) is a right side view, and FIG. 22 (D) is a top view.

Figure 1:
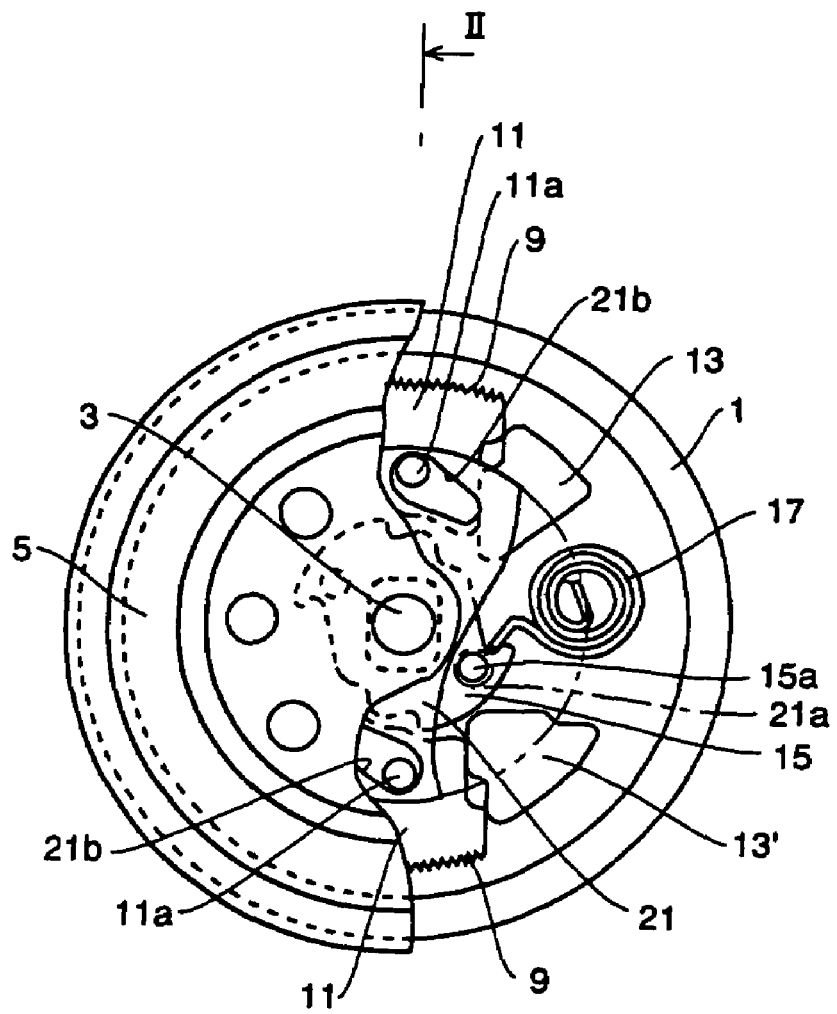
FIG. 1 illustrates a reclining device having a broken-out portion according to a related art.
Figure 2:
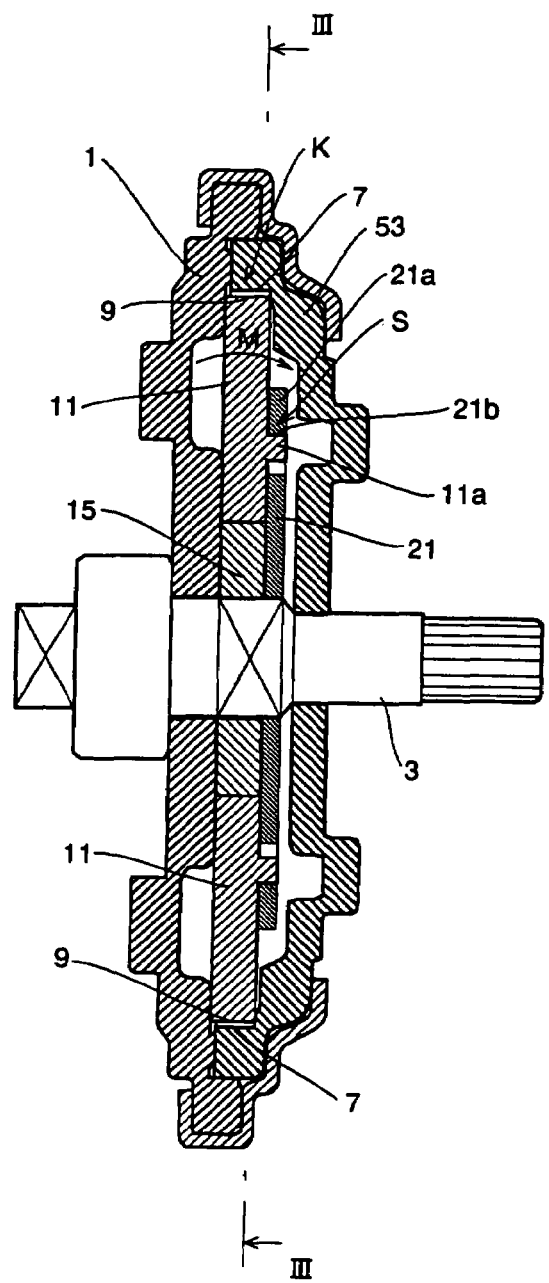
FIG. 2 is a cross-sectional view of the reclining device taken long a line II-II in FIG. 1.
Figure 3:
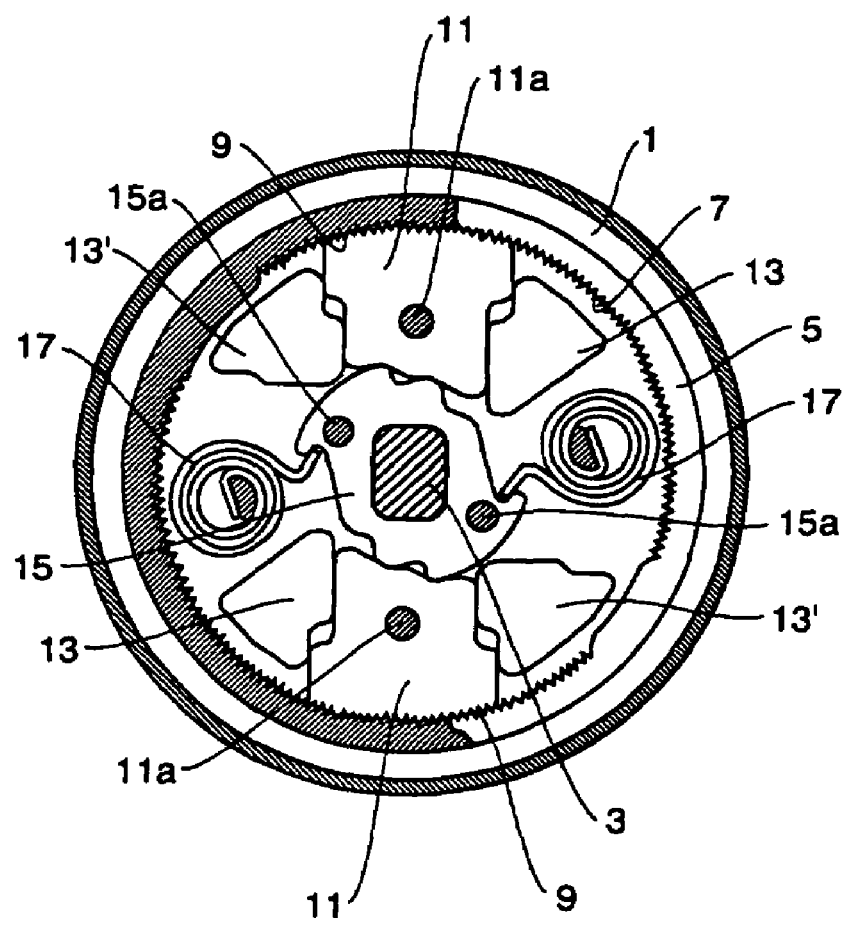
FIG. 3 is a cross-sectional view of the reclining device taken along a line III-III in FIG. 2.
Figure 4:
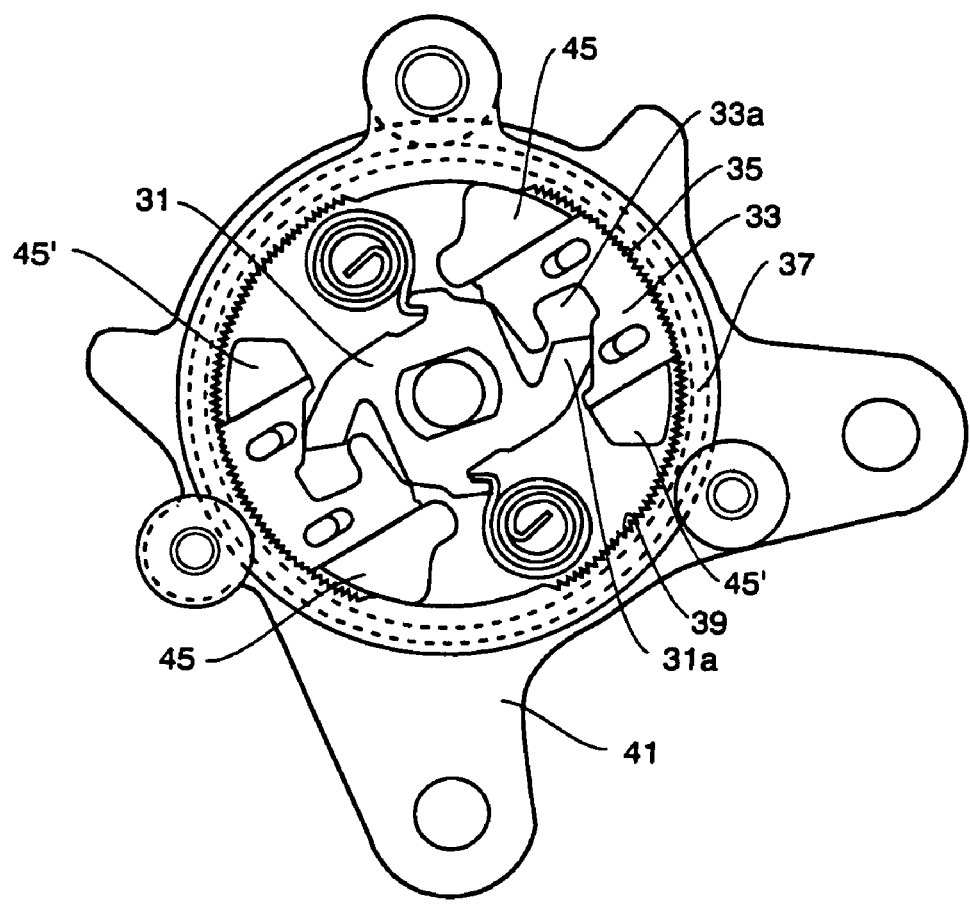
FIG. 4 illustrates a reclining device according to another related art.
Figure 5:
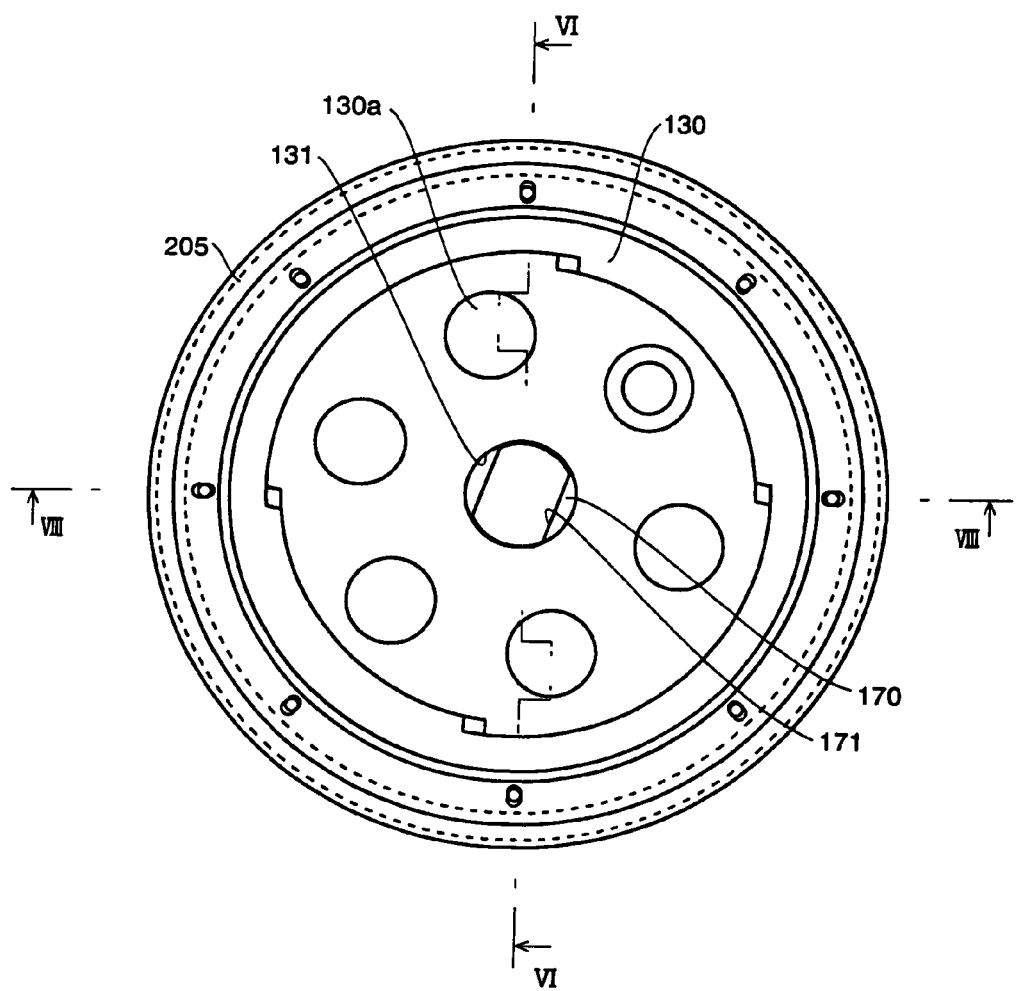
FIG. 5 illustrates an external appearance of a reclining device in a first embodiment according to the invention.

DESCRIPTION OF REFERENCE NUMERALS AND SIGNS 100 base plate
120 operation shaft
130 ratchet plate
133 inside teeth
140, 150 pawl
141, 151 outside teeth
144, 154 cam groove
180 release plate
183, 184 projection

BEST MODE FOR CARRYING OUT THE INVENTION

First Embodiment

Figure 6:
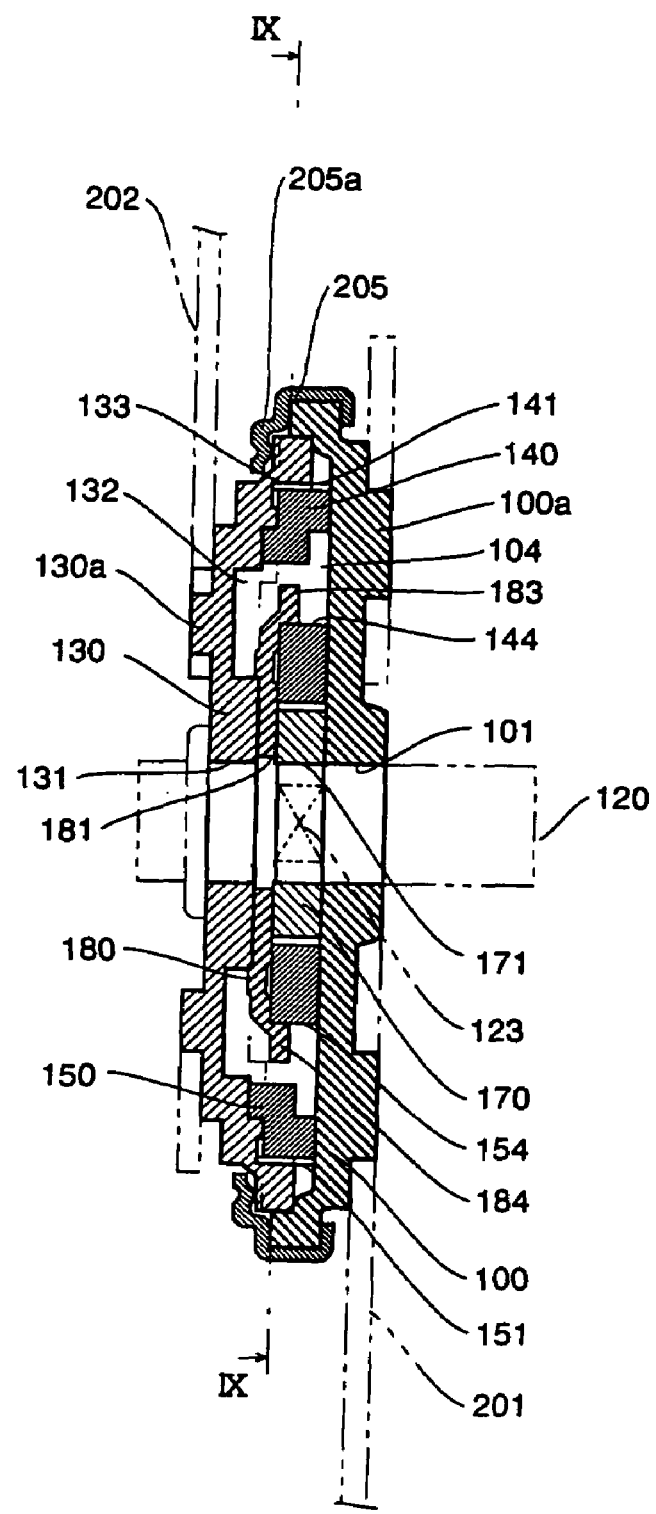
FIG. 6 is a cross-sectional view of the reclining device taken along a line VI-VI in FIG. 5.
Figure 7:
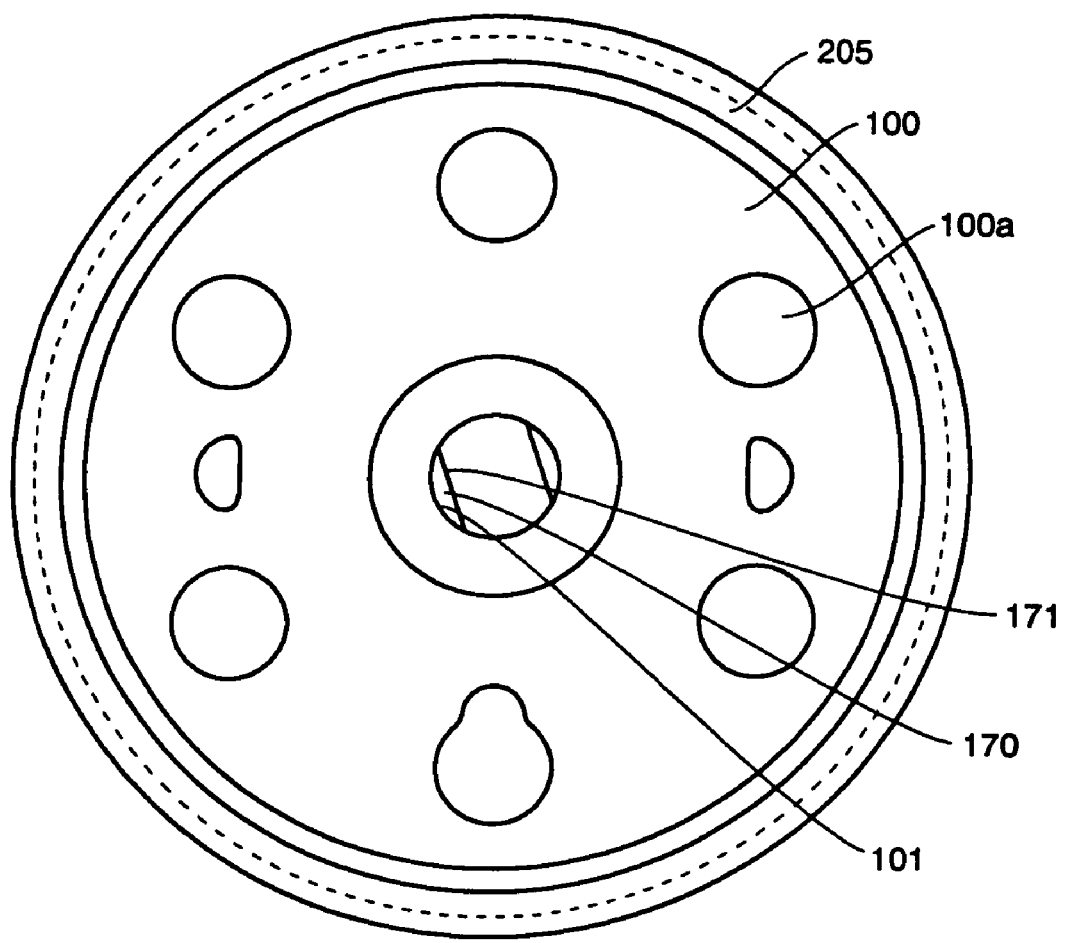
FIG. 7 is a back view of the reclining device shown in FIG. 5.

An embodiment according to the invention is now described with reference to FIGS. 5 through 13. As illustrated in FIG. 6, a reclining device according to this embodiment has a base plate 100 attached to a lower arm 201 of a seat cushion, and a ratchet plate 130 attached to an upper arm 202 of a seat back.

As illustrated in FIGS. 5 through 8, the disk-shaped ratchet plate 130 is superposed on the disk-shaped base plate 100 so that both the plates engage with each other and rotate relative to each other. A cylindrical fitting 205 covers the base plate 100 and the ratchet plate 130 from the outside to prevent separation of the ratchet plate 130 from the base plate 100. More specifically, one end of the fitting 205 engages with the outer circumference of the base plate 100, and the other end of the fitting 205, i.e., a ratchet plate holding member 205a, presses the ratchet plate 130 from the direction of the rotation center axis.

Figure 8:
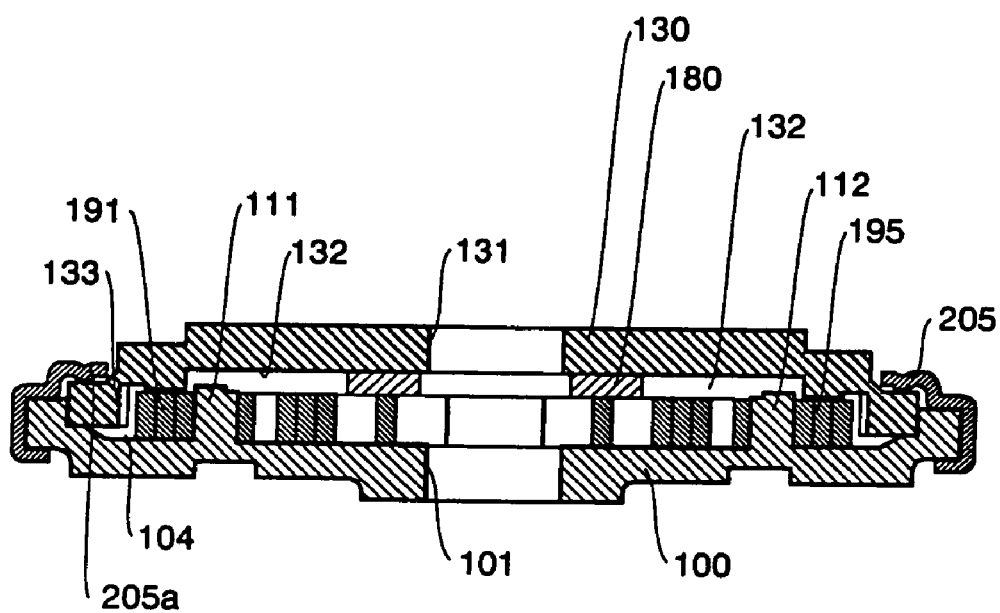
FIG. 8 is a cross-sectional view of the reclining device taken long a line VIII-VIII in FIG. 5.

Holes 101 and 131 formed on the base plate 100 and ratchet plate 130, respectively, are located at positions corresponding to the rotation center axis. An operation shaft 120 is inserted through the holes 101 and 131. As illustrated in FIGS. 6 and 8, a circular concavity 132 is formed around the operation shaft 120 on the surface of the ratchet plate 130 opposed to the base plate 100. Inside teeth 133 are provided on the inner circumferential wall surface of the concavity 132.

Figure 9:
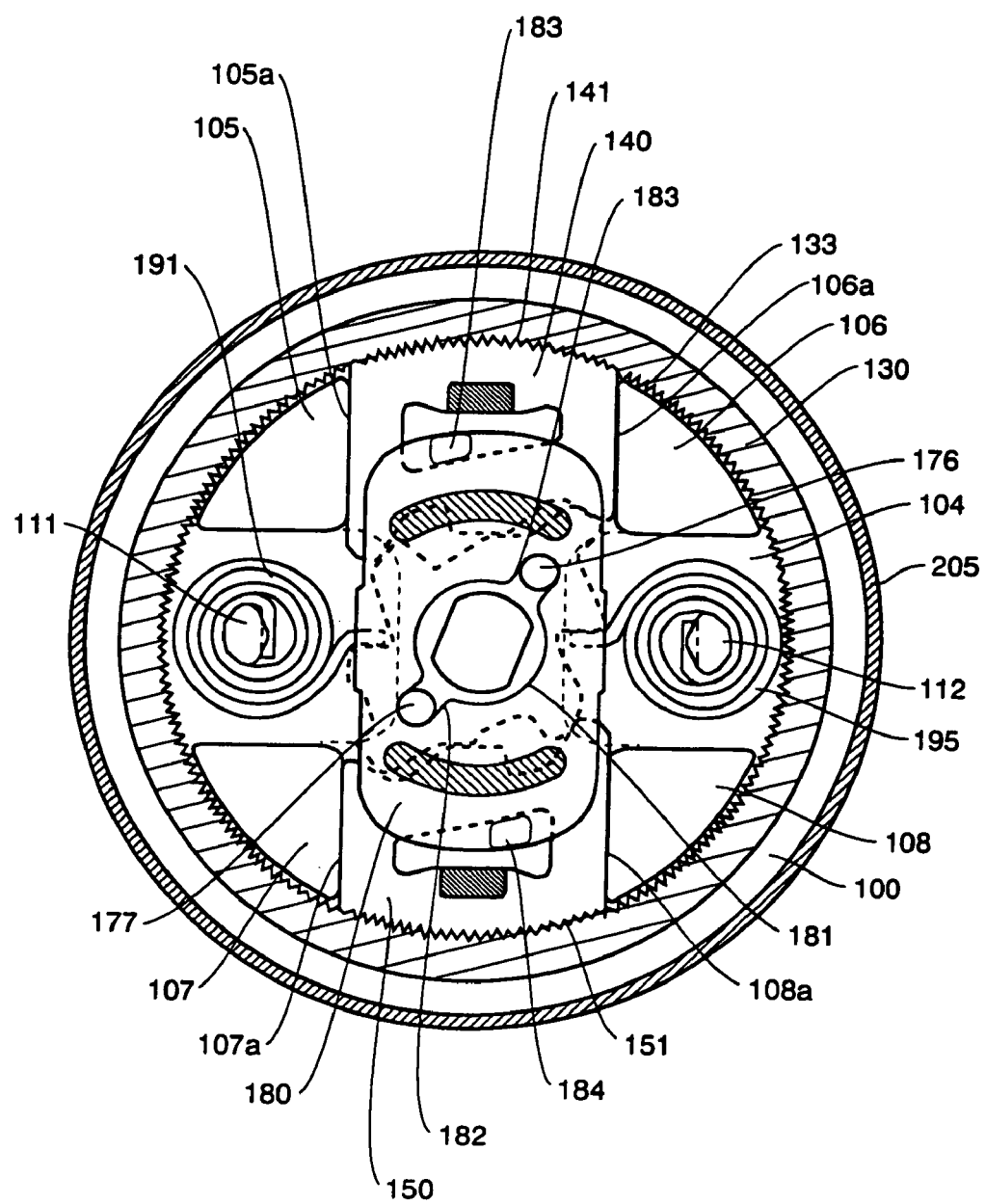
FIG. 9 is a cross-sectional view of the reclining device taken along a line IX-IX in FIG. 6.

As illustrated in FIGS. 6 and 8, a concavity 104 is similarly formed on the surface of the base plate 100 opposed to the concavity 132 of the ratchet plate 130. As illustrated in FIG. 9, a pair of guide projections 105 and 106 and a pair of guide projections 107 and 108 facing to the ratchet plate 130 are provided on the bottom surface of the concavity 104.

Figure 13A:
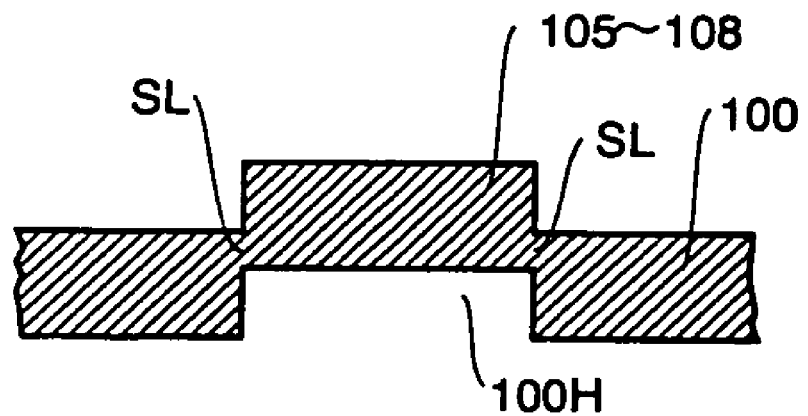
FIGS. 13 (A) and 13 (B) are cross-sectional views of a guide projection.
Figure 13B:
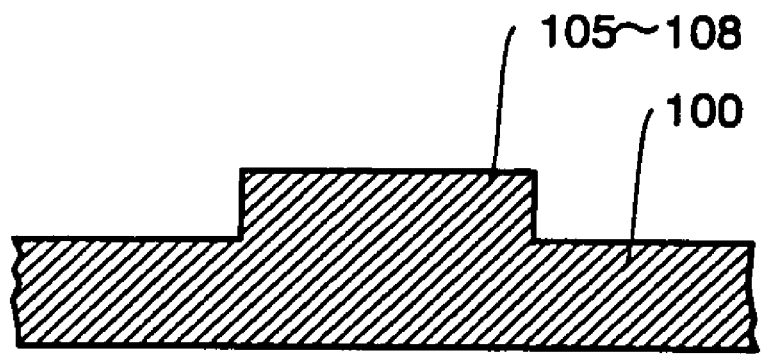

The base plate 100 according to this embodiment is formed by forging. When the base plate 100 is manufactured from a plate material not by forging but by ordinary press molding, a concave portion 100H produced by a press mold (male mold) remains on the back surfaces of the guide projections 105, 106, 107 and 108 as illustrated in FIG. 13 (A). Thus, a thinwall portion SL is formed on the guide projections 105, 106, 107 and 108, which lowers the strengths of the guide projections 105, 106, 107 and 108.

In this embodiment, the base plate 100 is manufactured by forging. In this process, the guide projections 105, 106, 107 and 108 are formed such that no concavity portion is produced on the back surfaces of the guide projections 105, 106, 107 and 108 on the base plate 100. That is, the guide projections 105, 106, 107 and 108 are solid; the back surfaces of the guide projections coinciding with the back surfaces of the base plate 100 and their peripheral areas have sufficient wall thickness. Accordingly, the strengths of the guide projections 105, 106, 107 and 108 can be increased.

A plurality of connecting projections 100a for connecting with the lower arm 201 of the seat cushion are provided on the back surface of the base plate 100 on the side opposite to the ratchet plate 130 on the same circumference around the hole 101 at equal intervals. A plurality of connecting projections 130a for connecting with the upper arm 202 of the seat back are similarly provided on the surface of the ratchet plate 130 on the side opposite to the base plate 100 on the same circumference around the hole 131 at equal intervals.

A pawl 140 has outside teeth 141 on its front end surface. The outside teeth 141 of the pawl 140 engage with and disengage from the inside teeth 133 of the ratchet plate 130 in the radial direction of the teeth end circle of the inside teeth 133. As illustrated in FIG. 9, the pawl 140 is sandwiched between guide surfaces 105a and 106a of the guide projections 105 and 106 such that the pawl 140 is slidingly guided in the direction perpendicular to the rotation center axis of the ratchet plate 130, i.e., in the radial direction of the teeth end circle of the inside teeth 133.

A pawl 150 has a shape identical to the shape of the pawl 140. The pawl 150 is sandwiched between guide surfaces 107a and 108a of the guide projections 107 and 108 such that the pawl 150 is slidingly guided in the radial direction of the teeth end circle of the inside teeth 133. This structure allows engagement between outside teeth 151 provided on the front end surface of the pawl 150 and the inside teeth 133 of the ratchet plate 130.

Figure 12:
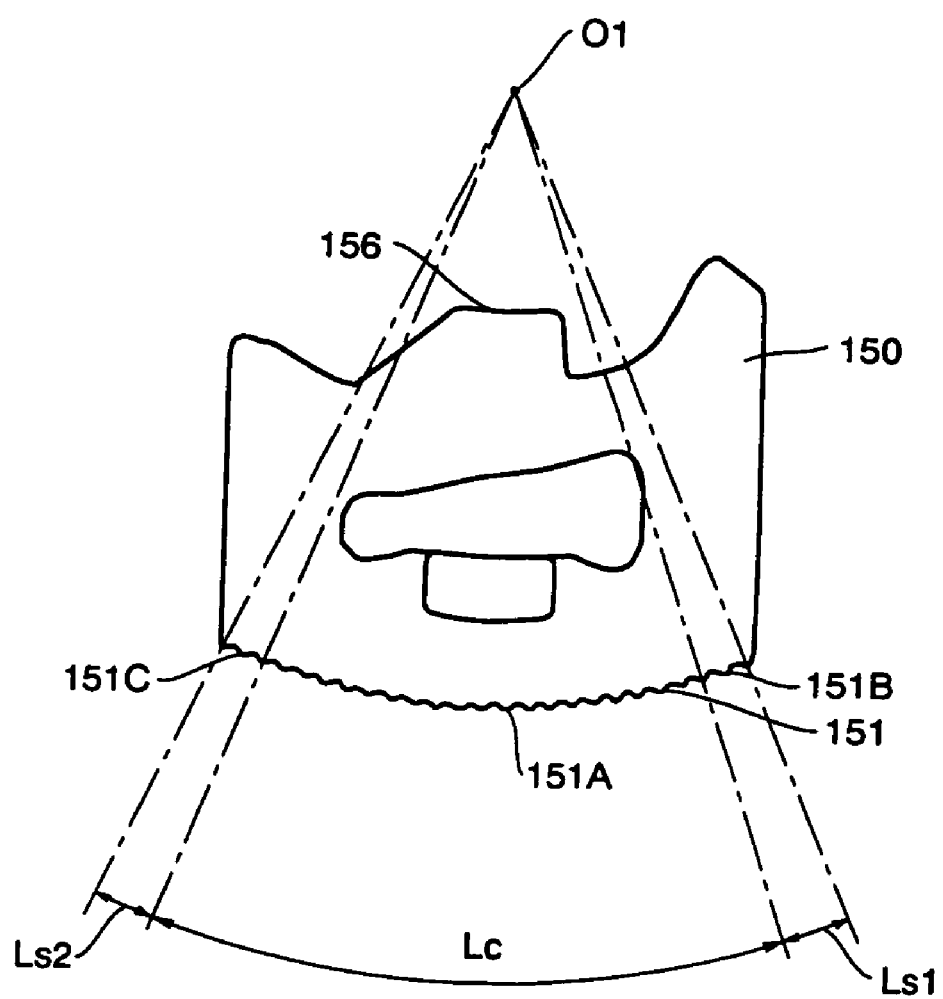
FIG. 12 illustrates the details of a pawl shown in FIG. 10.

Of the outside teeth 141 and 151 of the pawls 140 and 150, the outside teeth 151 are now discussed as an example. As illustrated in FIG. 12, the shapes of the outside teeth 151 (151A) located in a central area Lc of the pawl 150 in the width direction are different from the shapes of the outside teeth 151 (151B, 151C) located at both ends Ls1 and Ls2. More particularly, the thickness of the outside teeth 151A positioned in the central area Lc is smaller than the thicknesses of the outside teeth 151B and 151C on the pitch circle of the outside teeth 151B and 151C, and therefore the outside teeth 151A can engage with the inside teeth 133 of the ratchet plate 130 without interference therebetween. Since the outside teeth 151A have a smaller thickness, the outside teeth 151B and 151C positioned at the both ends Ls1 and Ls2 deeply engage with the inside teeth 133 of the ratchet plate 130 with no clearance between the outside teeth 151B and 151C and the inside teeth 133 at the time of locking.

Each number of the outside teeth 151B and 151C disposed at the both ends Ls1 and Ls2 is about 3, and the number of the outside teeth 151A disposed in the central area Lc is about 19, for example. The tooth bottoms at the joints between the central area Lc and the both ends Ls1 and Ls2 are smoothly connected with one another. A center 01 shown in FIG. 12 is the center of the pitch circle of the outside teeth 151B and 151C.

Figure 10:
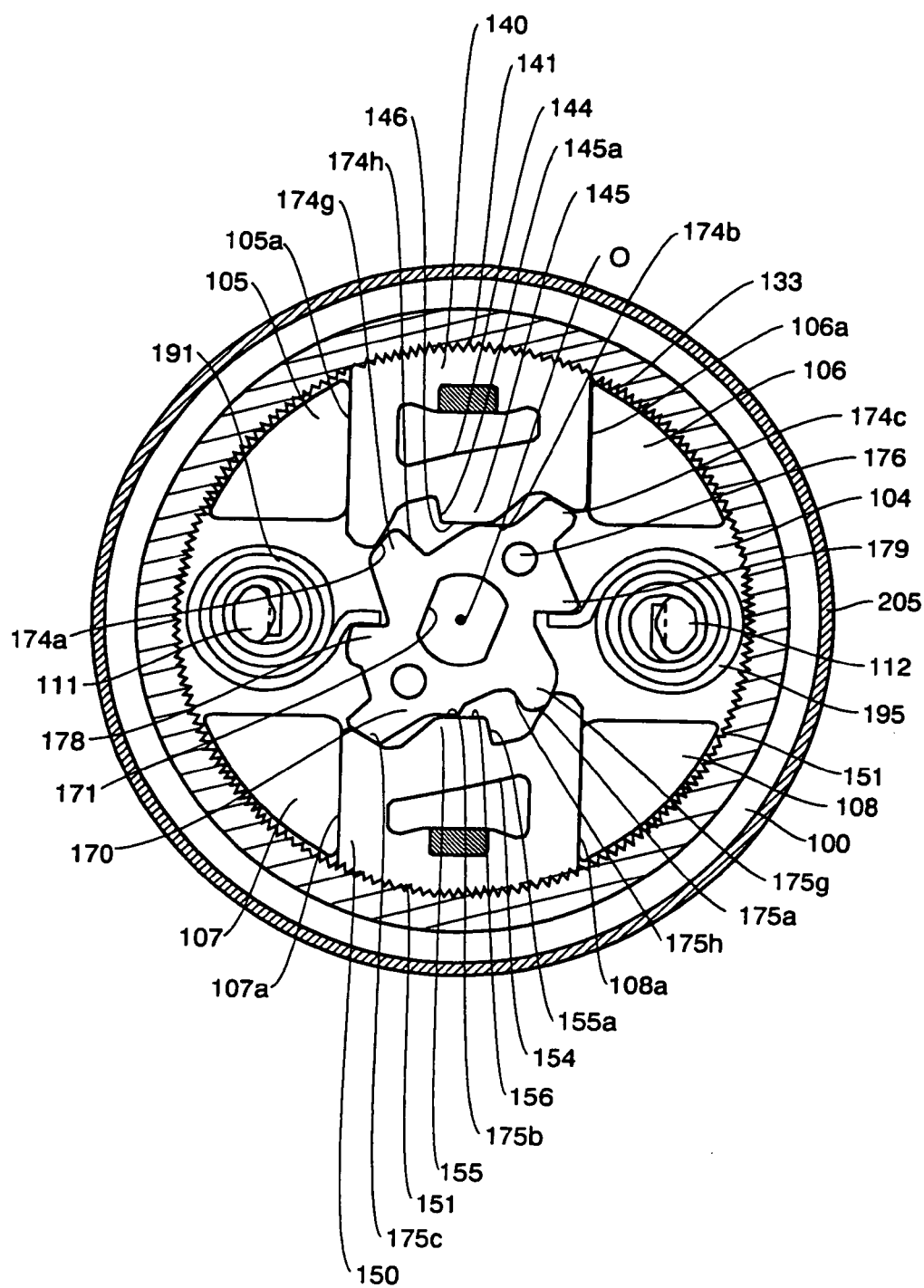
FIG. 10 illustrates the reclining device shown in FIG. 9 from which a release plate is removed.

As shown in FIG. 10, a cam 170 rotatable with the operation shaft 120 is disposed in a space on the side of rear end surfaces 146 and 156 of the pawls 140 and 150. A portion having an elliptical cross section 123 is formed in the intermediate part of the operation shaft 120 as illustrated in FIG. 6, and the portion having the cross section 123 engages with an elliptical hole 171 of the cam 170. In this structure, the operation shaft 120 and the cam 170 engage with each other such that both cannot rotate relative to each other, and thus the cam 170 rotates with the operation shaft 120.

The pawls 140 and 150 and the cam 170 have the same plate thickness, and disposed on the same plane of the base plate 100. The cam 170 has inclined cam surfaces 174$b$ and 175$b$ for pressing the rear end surfaces 146 and 156 of the pawls 140 and 150 to bring the outside teeth 141 and 151 of the pawls 140 and 150 into engagement with the inside teeth 133 of the ratchet plate 130 at the time of rotation of the cam 170. For offering this function effectively, the inclination directions of the inclined cam surfaces 174$b$ and 175$b$ are established such that the contact points between the inclined cam surfaces 174$b$ and 175$b$ and the rear end surfaces 146 and 156 of the pawls 140 and 150 move away from a rotation center O of the cam 170 when the cam 170 rotates in the direction of locking. For example, the inclination direction of the inclined cam surface 175$b$ shown in FIG. 11 is indicated by a curved or straight line rising to the right.

The cam 170 has projections 174$g$ and 175$g$ formed on supporting surfaces 174$a$ and 175$a$. The projections 174$g$ and 175$g$ are located before the inclined cam surfaces 174$b$ and 175$b$ in the direction of rotation of the cam 170 in the locking operation (anticlockwise direction in FIG. 10) and are opposed to the ends (front portions in the direction of rotation of the cam 170 in the locking operation) of the rear end surfaces 146 and 156 of the pawls 140 and 150 with clearance at the time of engagement between the outside teeth 141 and 151 of the pawls 140 and 150 and the inside teeth 133 of the ratchet plate 130. The supporting surfaces 174$a$ and 175$a$ contact and support the ends of the rear end surfaces 146 and 156 of the pawls 140 and 150 when load is applied from the ratchet plate 130 to the pawls 140 and 150 in the anticlockwise direction in FIG. 10 so as to prevent further inclination of the pawls 140 and 150.

The cam 170 also has supporting surfaces 174$c$ and 175$c$ located behind the inclined cam surfaces 174$b$ and 175$b$ in the direction of rotation of the cam 170 in the locking operation and opposed to the ends (rear portions in the direction of rotation of the cam 170 in the locking operation) of the rear end surfaces 146 and 156 of the pawls 140 and 150 at the time of engagement between the outside teeth 141 and 151 of the pawls 140 and 150 and the inside teeth 133 of the ratchet plate 130. The supporting surfaces 174$c$ and 175$c$ contact and support the ends of the rear end surfaces 146 and 156 of the pawls 140 and 150 when load is applied from the ratchet plate 130 to the pawls 140 and 150 in the clockwise direction in FIG. 10 so as to prevent further inclination of the pawls 140 and 150.

Figure 11:
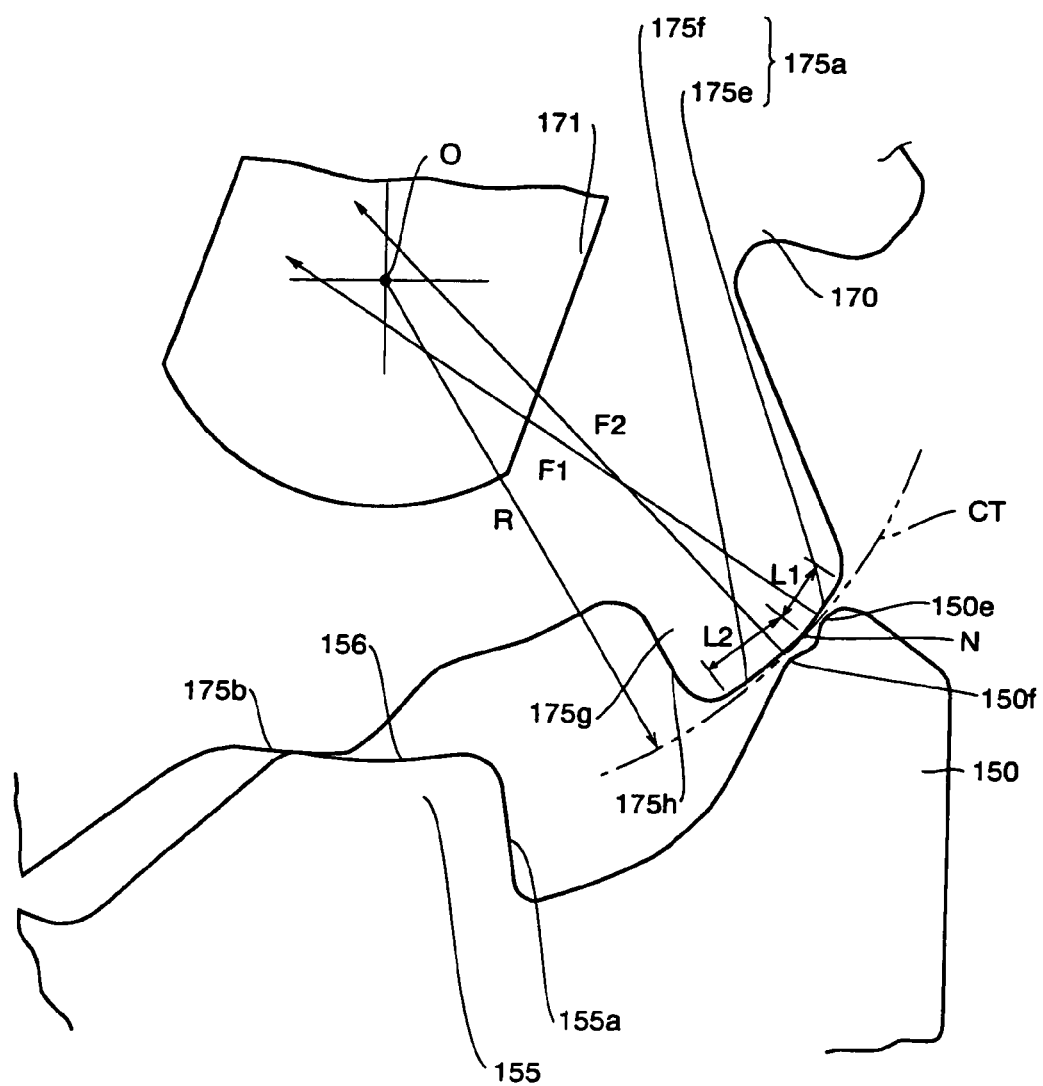
FIG. 11 is an enlarged view of a main part of the reclining device shown in FIG. 10.

In the supporting surfaces 174$a$, 174$c$, 175$a$ and 175$c$ and their peripheral areas, the detailed structure of the supporting surface 175$a$ is now discussed as an example with reference to FIG. 11. The supporting surface 175$a$ is constituted by a first inclined surface 175$e$ having a length L1 and inclined in the same direction as that of the inclined cam surface 175$b$, and a second inclined surface 175$f$ having a length L2 and inclined in the direction opposite to the direction of the inclined cam surface 175$b$. A first projection 150$e$ capable of contacting the first inclined surface 175$e$ and a second projection 150$f$ capable of contacting the second inclined surface 175$f$ are provided at the end of the rear end surface 156 of the pawl 150.

Examples of the first inclined surface 175$e$ and the second inclined surface 175$f$ are now explained. The outer circumferential surface of the first inclined surface 175$e$ is so formed that the distance between the rotation center of the cam 170 and a portion of the first inclined surface 175$e$ decreases as the portion is located closer to the leading area of the first inclined surface 175$e$ in the direction of rotation in the locking operation. On the other hand, the outer circumferential surface of the second inclined surface 175$f$ is so formed that the distance between the rotation center of the cam 170 and a portion of the second inclined surface 175$f$ increases as the portion is located closer to the leading area of the second inclined surface 175$f$ in the direction of rotation in the locking operation.

Thus, in the example in which the first inclined surface 175$e$ and the second inclined surface 175$f$ are produced by using a part of a circular arc CT of a radius R passing through a boundary point N of the fist inclined surface 175$e$ and the second inclined surface 175$f$, the first inclined surface 175$e$ positioned above the boundary point N is an inclined surface produced by inclining (bending) the circular arc CT around the boundary point N in the anticlockwise direction, and the second inclined surface 175$f$ positioned below the boundary point N is an inclined surface produced by inclining (bending) the circular arc CT around the boundary point N in the clockwise direction. Each of the supporting surfaces 174$a$, 174$c$ and 175$c$ other than the supporting surface 175$a$ has a first inclined surface and a second inclined surface formed in a similar manner.

Cam stopper surfaces 174$h$ and 175$h$ are formed on the sides of the projections 174$g$ and 175$g$ near the inclined cam surfaces 174$b$ and 175$b$. Pawl stopper surfaces 145$a$ and 155$a$ capable of contacting the cam stopper surfaces 174$h$ and 175$h$ are formed on the sides of the projections 145 and 155 on which the rear end surfaces 146 and 156 of the pawls 140 and 150 pressed by the inclined cam surfaces 174$b$ and 175$b$ are provided.

The cam stopper surfaces 174$h$ and 175$h$ contact the pawl stopper surfaces 145$a$ and 155$a$ when the outside teeth 141 and 151 of the pawls 140 and 150 separate from the inside teeth 133 of the ratchet plate 130. By the contact between the cam stopper surfaces 174$h$ and 175$h$ and the pawl stopper surfaces 145$a$ and 155$a$, further rotation of the cam 170 is prevented.

Cam grooves 144 and 154 are formed on the surfaces of the pawls 140 and 150 facing to the ratchet plate 130 (in this embodiment, the cam grooves 144 and 154 penetrate through the pawls 140 and 150 to the surface facing to the base plate 100). One surface of a release plate 180 constituting release means overlaps with the pawls 140 and 150 and the cam 170, and the other surface of the release plate 180 slidingly contacts the ratchet plate 130. A hole 181 through which the operation shaft 120 penetrates is formed at the center of the release plate 180.

As illustrated in FIGS. 9 and 10, projections 176 and 177 projecting toward the ratchet plate 130 are provided on the cam 170. The projections 176 and 177 engage with small slots 182 and 183 provided at the edge of the hole 181 of the release plate 180 and extending in the radial direction. Thus, the cam 170 rotates with the release plate 180.

As illustrated in FIGS. 6 and 9, projections 183 and 184 engaging with the cam grooves 144 and 154 are formed at the rotation end of the release plate 180 by press molding or other methods. The cam grooves 144 and 154 are so shaped as to force the pawls 140 and 150 to shift toward the rotation center of the cam 170 by the interaction of the cam grooves 144 and 154 and the projections 183 and 184 when the release plate 180 rotates clockwise in FIG. 9.

As illustrated in FIGS. 9 and 10, the inner ends of spiral springs 191 and 195 as urging means engage with hooks 111 and 112 of the base plate 100, and the outer ends of the spiral springs 191 and 195 engage with steps 178 and 179 of the cam 170. The spiral springs 191 and 195 rotationally urge the cam 170 such that the cam 170 presses the rear end surfaces 146 and 156 of the pawls 140 and 150.

The operation of the reclining device having the above structure is now described. In the locked condition, the cam 170 presses the rear end surfaces 146 and 156 of the pawls 140 and 150 by the urging force of the spiral springs 191 and 195, and the outside teeth 141 and 151 of the pawls 140 and 150 are brought into engagement with the inside teeth 133 of the ratchet plate 130. Thus, rotation of the ratchet plate (seat back) 130 is prevented.

The transition action to the locked condition is explained. The cam 170 having received the urging force of the spiral springs 191 and 195 initially rotates in the direction where the outside teeth 141 and 151 of the pawls 140 and 150 are brought into engagement with the inside teeth 133 of the ratchet plate 130. As a result, the inclined cam surfaces 174*b* and 175*b* of the cam 170 press the rear end surfaces 146 and 156 of the pawls 140 and 150, and the pawls 140 and 150 move in the radial direction where the outside teeth 141 and 151 engage with the inside teeth 133 of the ratchet plate 130.

The action of the peripheral area around the supporting surface 175*a* of the cam 170 in this step is discussed as an example. During the movement of the pawl 150, the first projection 150*e* as a part of the pawl 150 also shifts in the same direction away from the rotation center O of the cam 170. Simultaneously, the first inclined surface 175*e* of the cam 170 moves in accordance with the rotation of the cam 170 in such a direction as to follow and approach the first projection 150*e* of the pawl 150 when the first inclined surface 175*e* of the cam 170 is viewed from the first projection 150*e* of the pawl 150.

Thus, the clearance between the first projection 150*e* of the pawl 150 and the first inclined surface 175*e* of the cam 170 is not excessively increased in the locked condition. Accordingly, stable and large locking strength can be offered without considerable reduction of the locking strength.

When load is applied from the ratchet plate 130 to the pawl 150 at the time of collision of the vehicle or for other reasons in the locked condition where the outside teeth 151 of the pawl 150 engage with the inside teeth 133 of the ratchet plate 130, the pawl 150 is slightly tilted. As a result, the first projection 150*e* of the pawl 150 contacts the first inclined surface 175*e* of the cam 170, and the second projection 150*f* of the pawl 150 contacts the second inclined surface 175*f* of the cam 170. Thus, the pawl 150 is now supported by the three components of the inclined cam surface 175*b* and the first and second inclined surfaces 175*e* and 175*f* of the cam 170.

When load is applied from the ratchet plate 130 to the pawl 150, contact pressure is given to the contact surface between the first inclined surface 175*e* of the cam 170 and the first projection 150*e* of the pawl 150 in the common normal direction of the contact surface. Since the first inclined surface 175*e* inclined in the same direction as that of the inclined cam surface 175*b* is formed, a component force F1 pressing the cam 170 backward in the unlocking direction (a force generating a clockwise torque in FIG. 11) acts on the cam 170.

On the other hand, since the second inclined surface 175*f* inclined in the direction opposite to the direction of the inclined cam surface 175*b* is formed, a component force F2 rotating the cam 170 in the locking direction (a force generating an anticlockwise torque in FIG. 11) acts on the cam 170 at the contact surface between the second inclined surface 175*f* of the cam 170 and the second projection 150*f* of the pawl 150. As a result, the component force F1 pressing the cam 170 backward in the unlocking direction generated by the presence of the first inclined surface 175*e* is cancelled or reduced by the force F2 in the opposite direction generated by the presence of the second inclined surface 175*f*. Accordingly, the reclining unit does not come to the unlocked condition, and therefore large locking strength can be offered in this aspect.

There is a possibility that the second inclined surface 175*f* of the cam 170 does not contact the second projection 150*f* of the pawl 150. In this case, if the cam 170 reversely rotates, the cam 170 stops when the second projection 150*f* of the pawl 150 contacts the second inclined surface 175*f* of the cam 170. This is because the component force F2 for rotating the cam 170 in the locking direction is generated due to the presence of the second inclined surface 175*f* at the time of contact between the second projection 150*f* of the pawl 150 and the second inclined surface 175*f* of the cam 170.

When the operation shaft 120 is rotated clockwise in FIG. 10 and the cam 170 is also rotated clockwise against the urging forces of the spiral springs 191 and 195 in the locked condition, pressure applied to the rear end surfaces 146 and 156 of the pawls 140 and 150 by the cam 170 is released. Simultaneously, the projections 183 and 184 of the release plate 180 slidingly contact the inclined wall surfaces of the cam grooves 144 and 154 of the pawls 140 and 150, and the pawls 140 and 150 retreat in the direction where the outside teeth 141 and 151 of the pawls 140 and 150 move away from the inside teeth 133 of the ratchet plate 130. Consequently, the engagement between the outside teeth 141 and 151 of the pawls 140 and 150 and the inside teeth 133 of the ratchet plate 130 is released, and thus the ratchet plate (seat back) 130 comes to be tilting (unlocked condition).

The unlocking operation ends when the cam stopper surfaces 174*h* and 175*h* contact the pawl stopper surfaces 145*a* and 155*a*.

When the seat back is tilted to a desired angle and an operating force given to the operation shaft 120 is released, the cam 170 presses the rear end surfaces 146 and 156 of the pawls 140 and 150 by the urging forces of the spiral springs 191 and 195. As a result, the outside teeth 141 and 151 of the pawls 140 and 150 are again brought into engagement with the inside teeth 133 of the ratchet plate 130. Then, the reclining device returns to the condition where the rotation of the ratchet plate (seat back) 130 is prevented.

The structure in this embodiment offers the following advantages.

(1) In this embodiment, the force given from the projections of the release plate to the cam grooves of the pawls via the contact positions between the cam grooves and the projections acts on the central portions of the pawls in the plate thickness direction. Thus, no moments for inclining the pawls in the plate thickness direction are generated at the time of unlocking operation for rotating the release plate and separating the outside teeth of the pawls from the inside teeth of the ratchet plate. Therefore, no force for raising the pawls 140 and 150 from the ratchet plate 130 is produced, and maneuverability of the reclining device in the unlocking operation is improved. Moreover, since no interference between the cam and guide projections is caused, there is no necessity for reducing the size of the guide projections. Accordingly, sufficient strength of the guide projections can be secured.

(2) In this embodiment, the projections 183 and 184 as engaging members with the cam grooves 144 and 154 are formed integrally with the release plate 180. Thus, the structure of these components can be simplified and the release plate can be formed by press molding at low cost. Accordingly, the cost of the reclining device can be reduced.

(3) Since the outside teeth 141 and 151 provided in the central area of the pawls 140 and 150 engage with the inside teeth 133 of the ratchet plate 130 without interference therebetween, the outside teeth 141 and 151 provided at both ends deeply engage with the inside teeth 133 of the ratchet plate 130 in the locked condition without producing clearance between the outside teeth 141 and 151 provided at both ends and the inside teeth 133. Thus, in the locked condition where the outside teeth 141 and 151 at both ends firmly engage with the inside teeth 133, the pawls 140 and 150 are not easily inclined when load is applied from the ratchet plate 130 to the pawls 140 and 150 via the inside teeth 133. Since the inclinations of the pawls 140 and 150 are reduced, stable and large locking strength can be offered without decrease in engagement margin.

(4) Since the guide projections 105, 106, 107 and 108 are solid with no concavities on the back surfaces of the guide projections 105, 106, 107 and 108 provided on the base plate 100, the strengths of the guide projections 105, 106, 107 and 108 are increased with no deformation and breakage of the guide projections 105, 106, 107 and 108 caused. Thus, the pawls 140 and 150 are not easily tilted, and large locking strength is offered.

(5) In this embodiment, excessive enlargement of the clearances between the first projections of the pawls 140 and 150 and the first inclined surfaces of the cam 170 is prevented. Thus, stable and large locking strength can be offered without considerable reduction of the locking strength. When load is applied from the ratchet plate 130 to the pawls 140 and 150, component forces for pressing the cam 170 backward in the unlocking direction are given to the cam 170. However, since the second inclined surfaces inclined in the directions opposite to the directions of the inclined cam surfaces are provided on the cam 170, component forces for rotating the cam 170 in the locking direction also act on the cam 170. Thus, the forces for pressing the cam 170 backward in the unlocking direction produced by the presence of the first inclined surfaces are cancelled or reduced by the forces in the opposite direction produced by the presence of the second inclined surfaces. Accordingly, the reclining device does not come to the unlocked condition, and therefore large locking strength can be offered in this aspect.

(6) Particularly, in an arrangement where the shapes of the supporting surfaces (first inclined surfaces and second inclined surfaces) 174*a*, 174*c*, 175*a* and 175*c* and the inclined cam surfaces 174*b* and 175*b* of the cam 170 are so determined that the clearances between the first inclined surface 175*e* and the first projections 150*e* of the pawls 140 and 150 are kept constant ahead of and in back of the inclined cam surfaces 174*b* and 175*b* in the direction of rotation of the cam at the engagement positions of the outside teeth 141 and 151 of the pawls 140 and 150 and the inside teeth 133 of the ratchet plate 130, the locking strength does not considerably vary even when the engagement positions are shifted from the normal target positions by the presence of component tolerances.

(7) In this embodiment, the unlocking operation ends when the cam stopper surfaces 174*h* and 175*h* contact the pawl stopper surfaces 145*a* and 155*a*. The operation force for unlocking is transmitted from the operation shaft 120 to the cam 170. Thus, according to this embodiment, the clearance between the operation shaft 120 and the cam 170 is only the factor for the variances in the rotation of the operation shaft 120 in the unlocking operation, and therefore the angle through which the operation shaft 120 is rotated in the unlocking operation, i.e., the operation stroke in the unlocking operation is smaller than that in the related-art reclining device.

(8) The base plate 100 on which the cam 170, the pawls 140 and 150, and the guide projections 105, 106, 107 and 108 for guiding the pawls 140 and 150 are provided has a large strength such that the reclining device obtains sufficient locking strength in the locked condition. The unlocking operation ends when the cam stopper surfaces 174*h* and 175*h* of the cam 170 contact the pawl stopper surfaces 145*a* and 155*a* of the pawls 140 and 150. Since the cam 170 and the pawls 140 and 150 having large strength contact with each other, the release plate (release means) 180 is not required to have large strength even when large unlocking operation force is applied. Accordingly, the necessary cost is reduced.

The invention is not limited to this embodiment. For example, the shapes of the supporting surfaces (first inclined surfaces and second inclined surfaces) 174*a*, 174*c*, 175*a* and 175*c* and the inclined cam surfaces 174*b* and 175*b* may be shapes other than those in this embodiment as long as the outer circumferential surfaces of the inclined cam surfaces and the first inclined surfaces are so formed that the distances between the rotation center of the cam and portions of the outer circumferential surfaces decrease as the portions are located closer to the leading areas of the outer circumferential surfaces in the direction of rotation in the locking operation. On the other hand, the shapes of the second inclined surfaces may be shapes other than those in this embodiment as long as the outer circumferential surfaces of the second inclined surfaces are so formed that the distances between the rotation center of the cam and portions of the second inclined surfaces increase as the portions are located closer to the leading areas of the second inclined surfaces in the direction of rotation in the locking operation. In this structure, excessive enlargement of the clearances between the outside teeth of the pawls and the inside teeth of the ratchet plate can be prevented even when the engagement positions therebetween are shifted from the normal target positions by the presence of component tolerances. Furthermore, reverse rotation of the cam 170 can be avoided.

In this embodiment, the respective supporting surfaces 174*a*, 174*c*, 175*a* and 175*c* of the can 170 are constituted by the first inclined surfaces and the second inclined surfaces. However, only a part of the supporting surfaces (for example, only supporting surfaces 174*a* and 175*a*) may be constituted by the first inclined surfaces and the second inclined surfaces, and the other supporting surfaces (for example, supporting surfaces 174*c* and 175*c*) may be supporting surfaces having shapes similar to those in the related art.

The supporting surfaces 174*a*, 174*c*, 175*a* and 175*c* may be surfaces having circular-arc circumferences whose rotation centers are the rotation center of the cam 170 in lieu of the first and second inclined surfaces. In this case, the pawls 140 and 150 are required to have only one projection for each of the supporting surfaces 174*a*, 174*c*, 175*a* and 175*c*.

As for the method of attaching the reclining device according to this embodiment to the seat, the ratchet plate 130 may be attached to the seat cushion and the base plate 100 may be attached to the seat back.

In attaching the ratchet plate 130 and the base plate 100 to the upper arm and the lower arm, the connecting projections 130a of the ratchet plate 130 and the connecting projections 100a of the base plate 100 are brought into engagement with through holes of the upper arm and the lower arm and some of the engagement positions are welded. In this case, the numbers of the connecting projections 130a and connecting projections 100a are increased and a larger number of the engagement positions are welded when it is desired to increase the welding strength. However, when the numbers of the connecting projections 130a and connecting projections 100a are increased, there is a possibility that malfunction of the device is caused due to thermal deflection by welding. In order to avoid the malfunction, welding convexes having flat distal ends are formed on the ratchet plate 130 and the base plate 100 at positions causing no interference with the connecting projections 130a and connecting projections 100a. The welding convexes are applied to the upper arm and the lower arm, and then are laser-welded.

The number of the pawls (140 and 150) may be one or three or a larger number. The method for urging the cam 170 is not limited to the method using the spiral springs 191 and 195.

Second Embodiment

Figure 14:
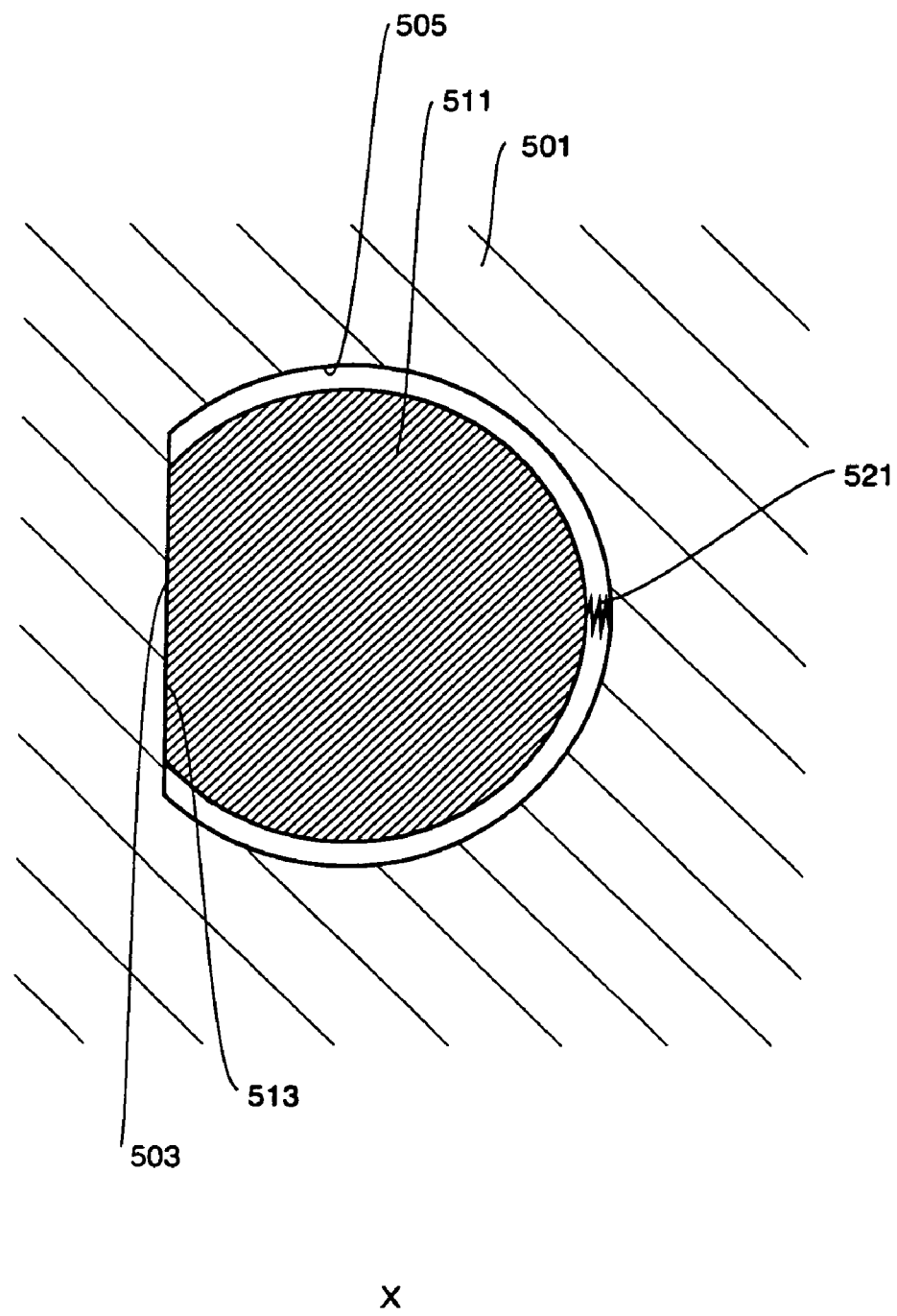
FIG. 14 illustrates a principle of a peripheral structure of an operational shaft in a second embodiment according to the invention.

A principle of a characteristic part different from the first embodiment is shown in FIG. 14. A cam 501 has a through hole 505 which has a first flat surface 503 extending in parallel with a rotation center axis of the cam 501. An operation shaft 511 has a 1'st flat surface 513 which is located on its outer circumferential surface and extends in parallel with the rotation center axis of the operation shaft 511.

When an elastic force generating member 521 contacts the inner circumferential surface of the through hole 505 of the cam 501 and the outer circumferential surface of the operation shaft 511 with pressure, the first flat surface 503 of the through hole 505 of the cam 501 comes into contact with the 1'st flat surface 513 of the operation shaft 511.

In this structure, the first flat surface 503 of the through hole 505 contacts the 1'st flat surface 513 of the operation shaft 511 when the elastic force generating member 521 contacts the inner circumferential surface of the throughY hole 505 of the cam 501 and the outer circumferential surface of the operation shaft 511 with pressure. Thus, the cam 501 and the operation shaft 511 can be positioned in a direction perpendicular to the first flat surface 503 (in a direction indicated by an arrow X in FIG. 14) on a plane parallel with a rotation plane (sheet surface) of the cam 501.

Since the cam 501 and the operation shaft 511 can be positioned in the direction perpendicular to the first flat surface 503 on the plane parallel with the rotation plane of the cam 501, the maneuverability of the reclining device at the time of operation can be enhanced. Examples of the elastic force generating member include a plate spring made of metal or resin, a coil spring, a plate and others, but are not limited thereto.

A reclining device in the second embodiment according to the invention is now specifically discussed with reference to FIGS. 15 through 22. In these figures, reference numbers similar to those in the first embodiment are given to similar components and parts. Initially, as illustrated in FIG. 17, the reclining device according to this embodiment has the base plate 100 attached to the lower arm 201 of the seat cushion and the ratchet plate 130 attached to the upper arm 202 of the seat back.

As illustrated in FIGS. 16 through 19, the disk-shaped ratchet plate 130 is superposed on the disk-shaped base plate 100 so that both plates engage with each other and rotate relative to each other. The cylindrical fitting 205 covers the base plate 100 and the ratchet plate 130 from the outside to prevent separation of the ratchet plate 130 from the base plate 100. More specifically, one end of the fitting 205 engages with the outer circumference of the base plate 100, and the other end of the fitting 205, i.e., the ratchet plate holding member 205a, presses the ratchet plate 130 from the direction of the rotation center axis.

Figure 19:
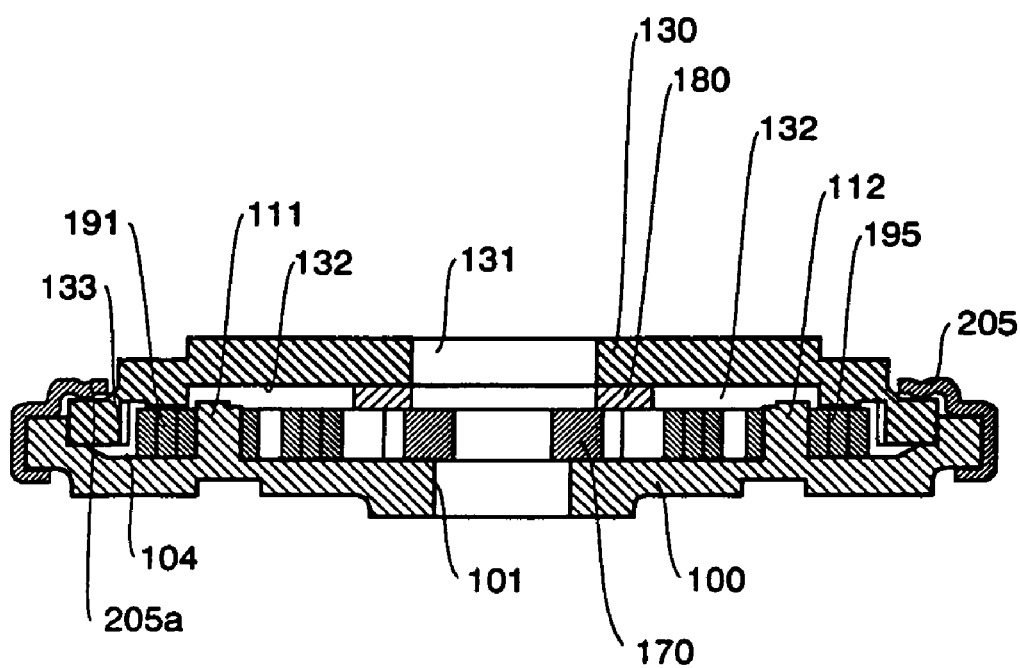
FIG. 19 is a cross-sectional view of the reclining device taken long a line XIX-XIX in FIG. 16.

The holes 101 and 131 are formed on the base plate 100 and ratchet plate 130, respectively, at positions corresponding to the rotation center axis. The operation shaft 120 is inserted through the holes 101 and 131. As illustrated in FIGS. 17 and 19, the circular concavity 132 is formed around the operation shaft 120 on the surface of the ratchet plate 130 opposed to the base plate 100. The inside teeth 133 are provided on the inner circumferential wall surface of the concavity 132.

Figure 17:
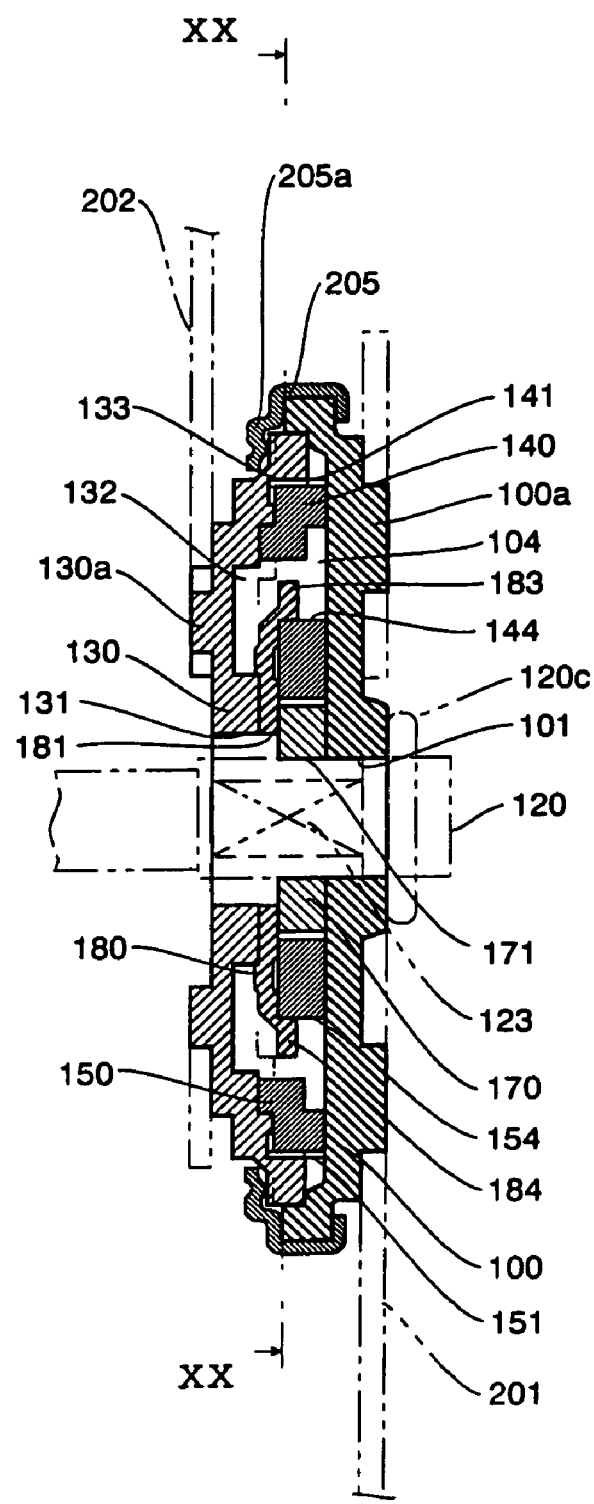
FIG. 17 is a cross-sectional view of the reclining device taken along a line XVII-XVII in FIG. 16.
Figure 18:
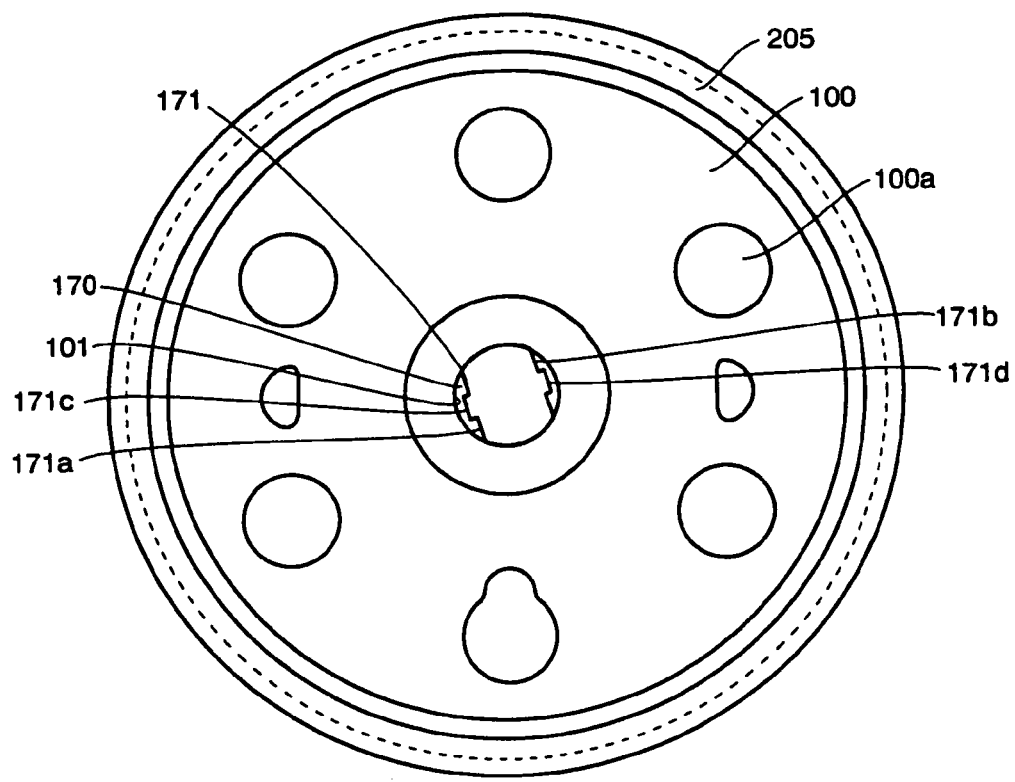
FIG. 18 is a back view of the reclining device shown in FIG. 16.
Figure 20:
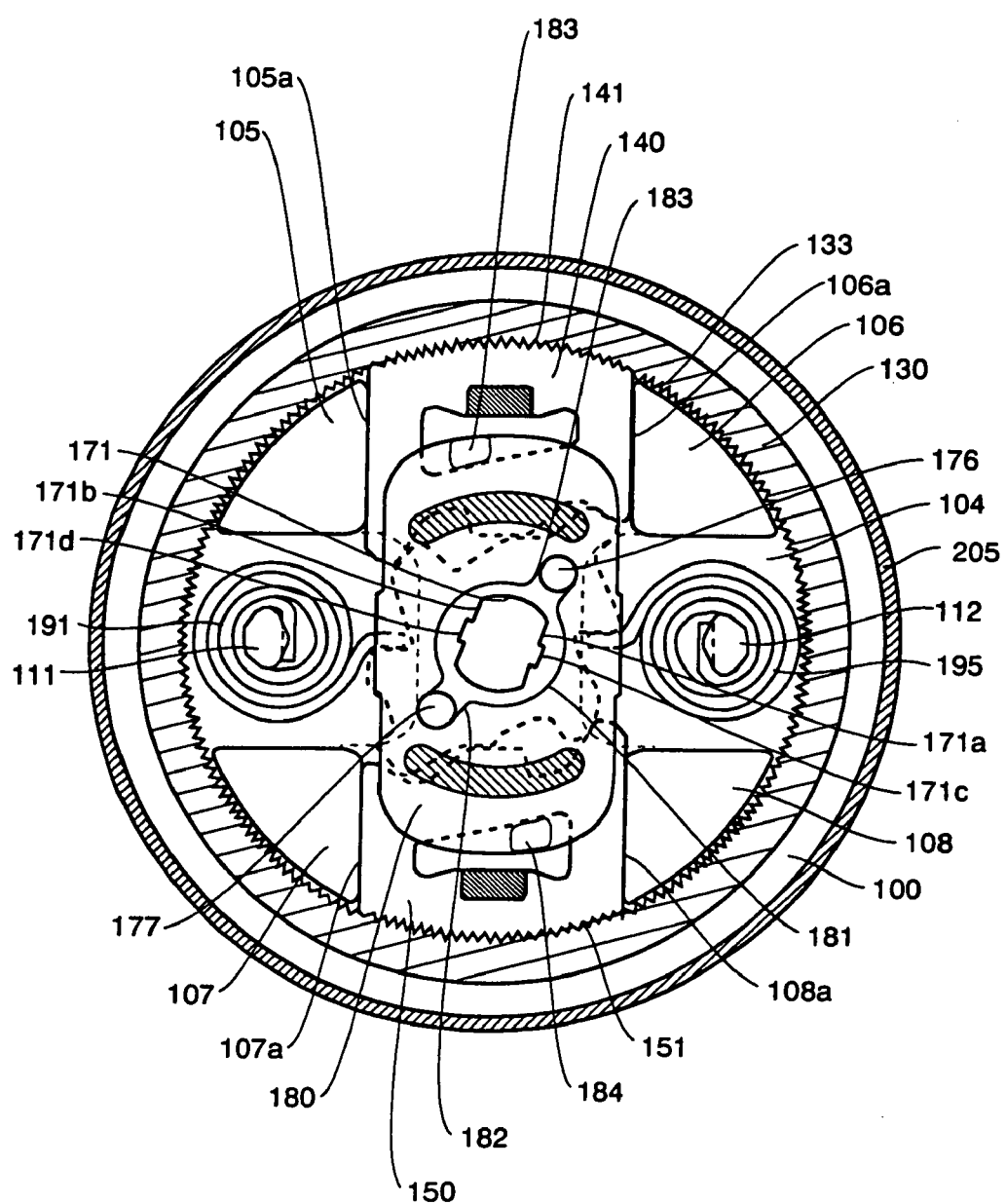
FIG. 20 is a cross-sectional view of the reclining device taken long a line XX-XX in FIG. 17.

As illustrated in FIGS. 17 and 19, the concavity 104 is similarly formed on the surface of the base plate 100 opposed to the concavity 132 of the ratchet plate 130. As illustrated in FIG. 20, a pair of the guide projections 105 and 106 and a pair of the guide projections 107 and 108 facing to the ratchet plate 130 are provided on the bottom surface of the concavity 104.

A plurality of the connecting projections 100a for connecting with the lower arm 201 of the seat cushion are provided on the surface of the base plate 100 on the side opposite to the ratchet plate 130 on the same circumference around the hole 101 at equal intervals. A plurality of the connecting projections 130a for connecting with the upper arm 202 on the seat back side are similarly provided on the surface of the ratchet plate 130 on the side opposite to the base plate 100 on the same circumference around the hole 131 at equal intervals.

The pawl 140 has the outside teeth 141 on its front end surface. The outside teeth 141 of the pawl 140 engage with and disengage from the inside teeth 133 of the ratchet plate 130 in the radial direction of the teeth end circle of the inside teeth 133. As illustrated in FIG. 20, the pawl 140 is sandwiched between the guide surfaces 105a and 106a of the guide projections 105 and 106 such that the pawl 140 is slidingly guided in the direction perpendicular to the rotation center axis of the ratchet plate 130, i.e., in the radial direction of the teeth end circle of the inside teeth 133.

The pawl 150 is similarly sandwiched between the guide surfaces 107a and 108a of the guide projections 107 and 108 such that the pawl 150 is slidingly guided in the radial direction of the teeth end circle of the inside teeth 133. This structure allows engagement between outside teeth 151 provided on the front end surface of the pawl 150 and the inside teeth 133 of the ratchet plate 130.

The cam 170 rotatable with the operation shaft 120 is disposed in a space on the side of the rear end surfaces 146 and 156 of the pawls 140 and 150.

Figure 15:
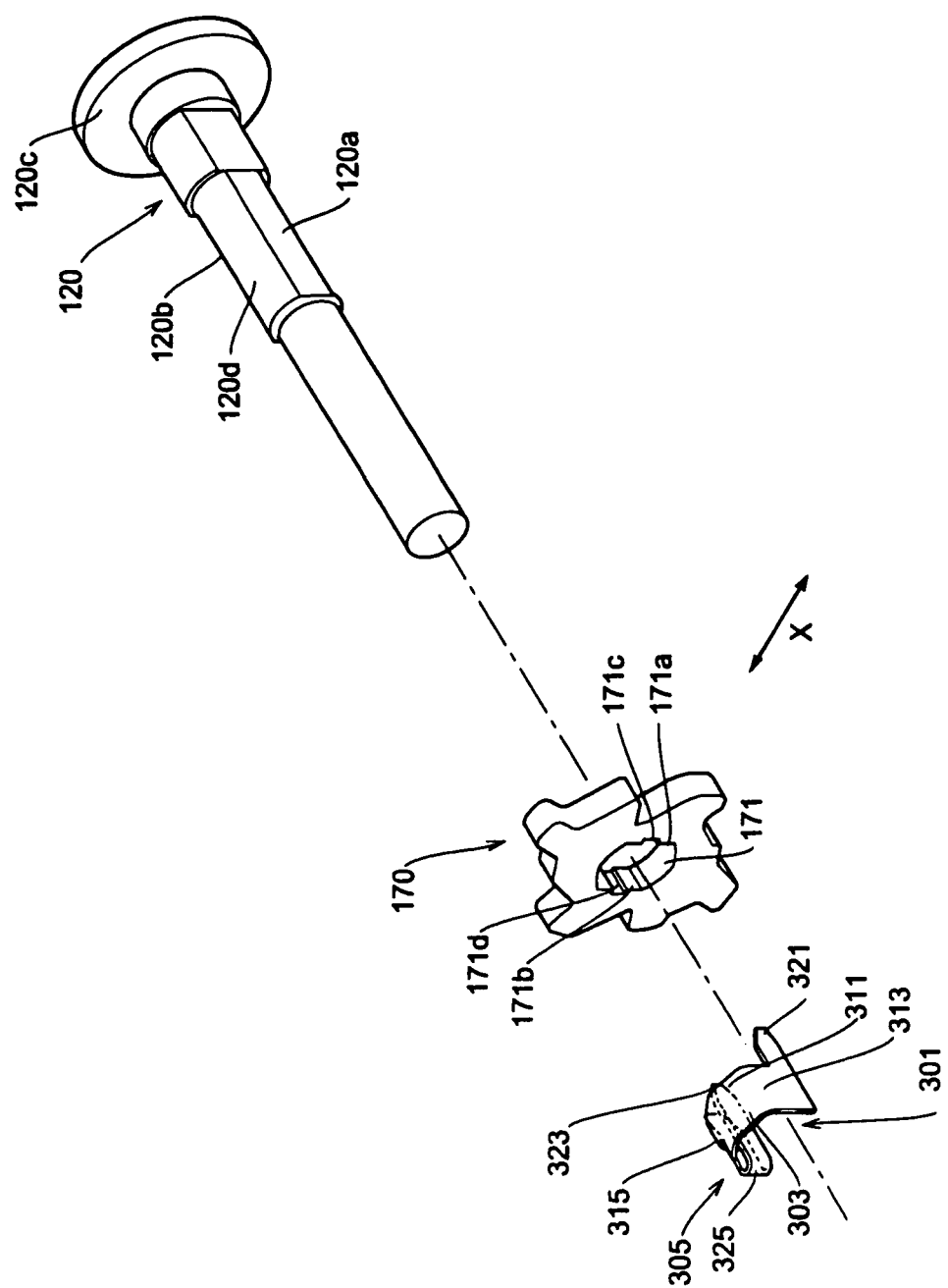
FIG. 15 is a perspective view showing the disassembled peripheral area of the operational shaft in the second embodiment according to the invention.
Figure 16:
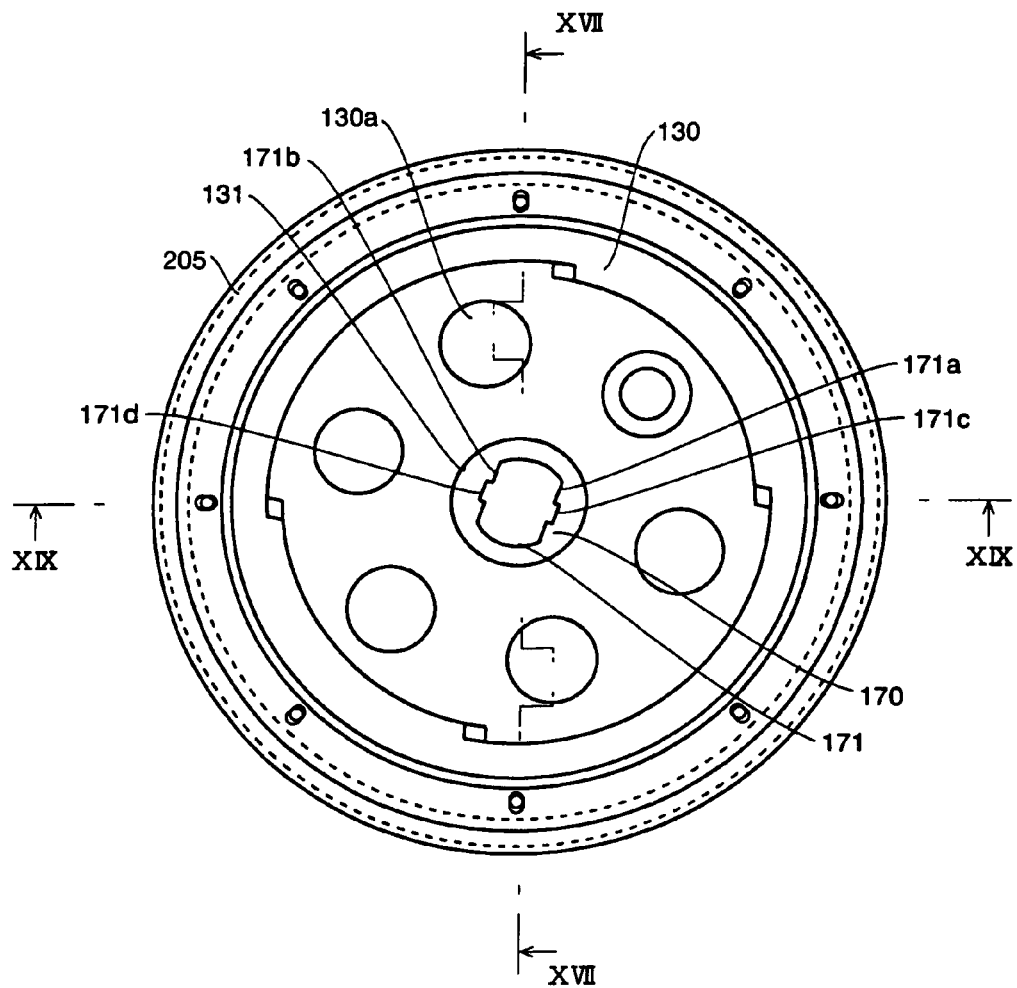
FIG. 16 illustrates an external view of a reclining device in the second embodiment according to the invention.
Figure 22:
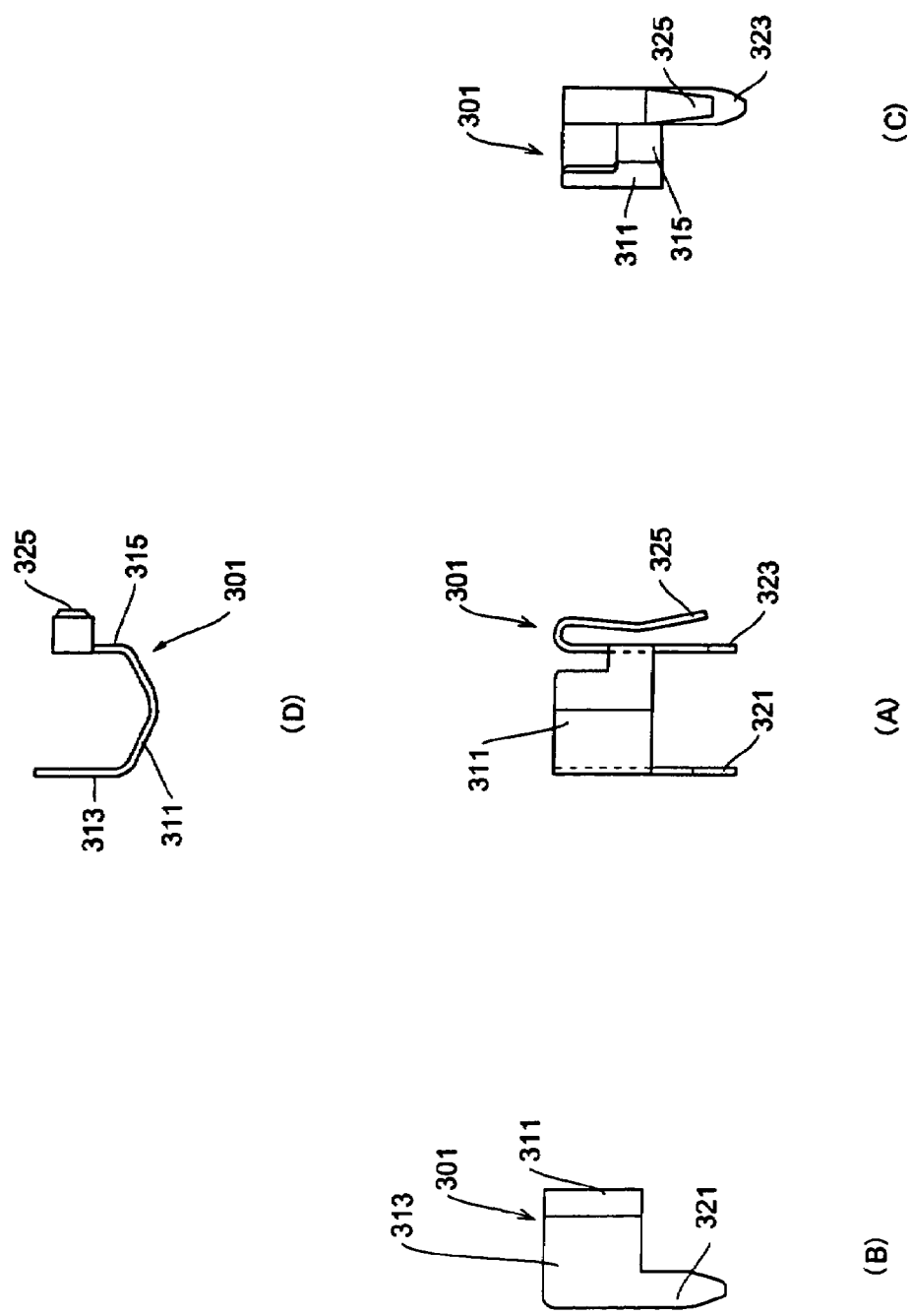
FIGS. 22 (A) through 22 (D) illustrate a spring plate, where

The structure for attaching the operation shaft 120 and the cam 170 is now discussed with reference to FIGS. 15 and 22. The cam 170 has the elliptical hole (through hole) 171 which has an elliptical cross section and through which the operation shaft 120 is inserted leaving play. A first flat surface 171a extending parallel with the rotation center axis of the cam 170 and a second flat surface 171b extending parallel with the first flat surface 171a are formed on the inner circumferential surface of the elliptical hole 171. A first groove 171c extending along the rotation center axis of the cam 170 is formed on the first flat surface 171*a* of the cam 170, and a second groove 171*d* extending along the rotation center axis of the cam 170 is formed on the second flat surface 171*b* of the cam 170.

The intermediate portion of the operation shaft 120 has an elliptical cross section. A 1'st flat surface 120*a* extending parallel with the rotation center axis of the operation shaft 120 and a 2'nd flat surface 120*b* extending parallel with the 1'st flat surface 120*a* are formed on the outer circumferential surface of the intermediate portion of the operation shaft 120. A flange 120*c* having a larger diameter than the diameter of the hole 101 of the base plate 100 is provided on the operation shaft 120 at the portion projecting through the hole 101 of the base plate 100 to the outside. The flange 120*c* prevents separation of the operation shaft 120 from the base plate 100 toward the ratchet plate 130.

A spring plate 301 as an elastic force generating member is provided at the intermediate portion of the operation shaft 120. The spring plate 301 is roughly divided into a holding unit 303 attached to an area of the outer circumferential surface of the operation shaft 120 other than the portion opposed to the inner circumferential surface of the elliptical hole 171 of the cam 170, and an elastic force generating unit 305 positioned next to the holding unit 303 for contacting the inner circumferential surface of the elliptical hole 171 of the cam 170 and the outer circumferential surface of the operation shaft 120 with pressure.

The holding unit 303 is constituted by a base section 311 opposed to a circumferential surface 120*d* interposed between the 1'st flat surface 120*a* and the 2'nd flat surface 120*b* of the operation shaft 120, a contact section 313 positioned next to one end of the base section 311 for contacting the 1'st flat surface 120*a* of the operation shaft 120 with pressure, and a second contact section 315 positioned next to the other end of the base plate 311 for contacting the 2'nd flat surface 120*b* of the operation shaft 120 with pressure.

The first contact section 313 has a first guide section 321 which is inserted into the first groove 171*c* and has a shape whose width in the width direction of the first groove 171*c* is gradually decreased. The second contact section 315 has a second guide section 323 which is inserted into the second groove 171*d* while contacting the 2'nd flat surface 120*b* of the operation shaft 120 and has a shape whose width in the width direction of the second groove 171*d* is gradually decreased, and a spring section 325 for bringing the first flat surface 171*a* of the elliptical hole 171 of the cam 170 into contact with the 1'st flat surface 120*a* of the operation shaft 120 in cooperation with the second guide section 323 whose base end is folded through 180 degrees and inserted into the second groove 171*d* such that the base end can contact the bottom surface of the second groove 171*d* with pressure. Thus, the elastic generating unit 305 is constituted by the second guide section 323 and the spring section 325.

The method for attaching the operation shaft 120 and the cam 170 according to this embodiment is now discussed. Initially, the operation shaft 120 is inserted through the elliptical hole 171 of the cam 170 leaving play therebetween. Then, the holding unit 303 of the spring plate 301 is attached to an area of the outer circumferential surface of the operation shaft 120 other than the portion opposed to the inner circumferential surface of the elliptical hole 171 of the cam 170 such that the holding unit 303 of the spring plate 301 can be temporarily retained. Thereafter, the spring plate 301 is shifted along the operation shaft 120, where the first guide section 321 is inserted into the first groove 171*c* of the cam 170 and the second guide section 323 and spring section 325 (elastic force generating unit 305) are inserted into the second groove 171*d* of the cam 170.

When the first guide section 321 and the elastic force generating unit 305 are inserted and the first guide section 321 and the second guide section 323 slidingly contact the side wall surfaces of the first groove 171*c* and the second groove 171*d*, respectively, a force for shifting the base section 311 of the holding unit 303 toward the outer circumferential surface of the operation shaft 120 is given to the spring plate 301 since the widths of the first guide section 321 and the second guide section 323 in the width directions of the first groove 171*c* and the second groove 171*d* are gradually decreased to the distal ends of the guide sections 321 and 323.

By the contact between the base section 311 of the holding unit 303 and the outer circumferential surface of the operation shaft 120, the cam 170 and the operation shaft 120 can be positioned in the direction parallel with the first flat surface 171*a* on the plane parallel with the rotation plane of the cam 170.

The second guide section 323 of the elastic force generating unit 305 contacts the 2'nd flat surface 120*b* of the operation shaft 120 (outer circumferential surface of operation shaft 120) with pressure, and the spring section 325 contacts the bottom surface of the second groove 171*d* of the cam 170 (inner circumferential surface of elliptical hole 171 of cam 170) with pressure. As a result, the first flat surface 171*a* of the elliptical hole 171 of the cam 170 contacts the 1'st flat surface 120*a* of the operation shaft 120, and thus the cam 170 and the operation shaft 120 can be positioned in the direction perpendicular to the first flat surface 171*a* (the direction of arrow X in FIG. 15) on the plane parallel with the rotation plane of the cam 170 (sheet surface).

By this positioning, the operation shaft 120 and the cam 170 engage with each other such that they cannot rotate relative to each other, and thus the cam 170 comes to rotate with the operation shaft 120.

The pawls 140 and 150 and the cam 170 have the same plate thickness, and disposed on the same plane of the base plate 100. The cam 170 has the inclined cam surfaces 174*b* and 175*b* for pressing the rear end surfaces 146 and 156 of the pawls 140 and 150 to bring the outside teeth 141 and 151 of the pawls 140 and 150 into engagement with the inside teeth 133 of the ratchet plate 130 at the time of rotation of the cam 170. For offering this function effectively, the inclination directions of the inclined cam surfaces 174*b* and 175*b* are established such that the contact points between the inclined cam surfaces 174*b* and 175*b* and the rear end surfaces 146 and 156 of the pawls 140 and 150 move away from the rotation center O of the cam 170 when the cam 170 rotates in the direction of locking.

The cam 170 has the supporting surfaces 174*a* and 175*a* located before the inclined cam surfaces 174*b* and 175*b* in the direction of rotation of the cam 170 in the locking operation (anticlockwise direction in FIG. 21) and opposed to the ends (front portions in the direction of rotation of the cam 170 in the locking operation) of the rear end surfaces 146 and 156 of the pawls 140 and 150 with clearance at the time of engagement between the outside teeth 141 and 151 of the pawls 140 and 150 and the inside teeth 133 of the ratchet plate 130. The supporting surfaces 174*a* and 175*a* contact and support the ends of the rear end surfaces 146 and 156 of the pawls 140 and 150 when load is applied from the ratchet plate 130 to the pawls 140 and 150 in the anticlockwise direction in FIG. 21 so as to prevent further inclination of the pawls 140 and 150.

The cam 170 also has the supporting surfaces 174*c* and 175*c* located behind the inclined cam surfaces 174*b* and 175*b* in the direction of rotation of the cam 170 in the locking operation and opposed to the ends (rear portions in the direction of rotation of the cam 170 in the locking operation) of the rear end surfaces 146 and 156 of the pawls 140 and 150 at the time of engagement between the outside teeth 141 and 151 of the pawls 140 and 150 and the inside teeth 133 of the ratchet plate 130. The supporting surfaces 174c and 175c contact and support the ends of the rear end surfaces 146 and 156 of the pawls 140 and 150 when load is applied from the ratchet plate 130 to the pawls 140 and 150 in the clockwise direction in FIG. 21 so as to prevent further inclination of the pawls 140 and 150.

The cam grooves 144 and 154 are formed on the surfaces of the pawls 140 and 150 facing to the ratchet plate 130 (in this embodiment, the cam grooves 144 and 154 penetrate through the pawls 140 and 150 to the surface facing to the base plate 100). One surface of the release plate 180 constituting release means overlaps with the pawls 140 and 150 and the cam 170, and the other surface of the release plate 180 slidingly contacts the ratchet plate 130. The hole 181 through which the operation shaft 120 penetrates is formed at the center of the release plate 180.

Figure 21:
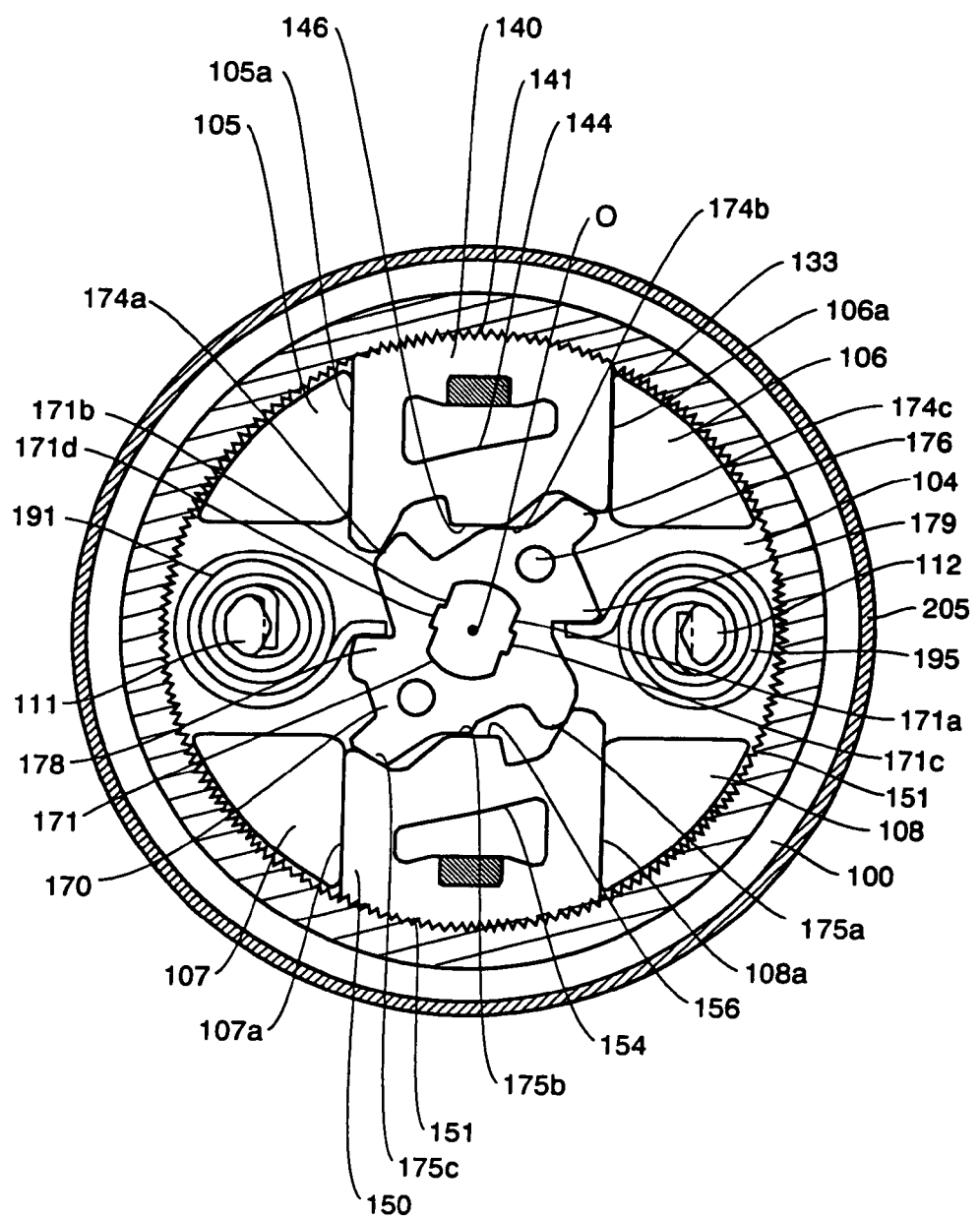
FIG. 21 illustrates the reclining device shown in FIG. 20 from which a release plate is removed.

As illustrated in FIGS. 20 and 21, the projections 176 and 177 projecting toward the ratchet plate 130 are provided on the cam 170. The projections 176 and 177 engage with the small slots 182 and 183 provided at the edge of the hole 181 of the release plate 180 and extending in the radial direction. Thus, the cam 170 rotates with the release plate 180.

As illustrated in FIGS. 17 and 20, the projections 183 and 184 engaging with the cam grooves 144 and 154 are formed at the rotation end of the release plate 180 by press molding or other methods. The cam grooves 144 and 154 are so shaped as to force the pawls 140 and 150 to shift toward the rotation center of the cam 170 by the interaction of the cam grooves 144 and 154 and the projections 183 and 184 when the release plate 180 rotates clockwise in FIG. 20.

As illustrated in FIGS. 20 and 21, the inner ends of the spiral springs 191 and 195 as urging means engage with the hooks 111 and 112 of the base plate 100, and the outer ends of the spiral springs 191 and 195 engage with the steps 178 and 179 of the cam 170. The spiral springs 191 and 195 rotationally urge the cam 170 such that the cam 170 presses the rear end surfaces 146 and 156 of the pawls 140 and 150.

The operation of the reclining device having the above structure is now described. In the locked condition, the cam 170 presses the rear end surfaces 146 and 156 of the pawls 140 and 150 by the urging force of the spiral springs 191 and 195, and the outside teeth 141 and 151 of the pawls 140 and 150 are brought into engagement with the inside teeth 133 of the ratchet plate 130. Thus, rotation of the ratchet plate (seat back) 130 is prevented.

When the operation shaft 120 is rotated clockwise in FIG. 21 and the cam 170 is also rotated clockwise against the urging forces of the spiral springs 191 and 195 in the locked condition, pressure applied to the rear end surfaces 146 and 156 of the pawls 140 and 150 by the cam 170 is released. Simultaneously, the projections 183 and 184 of the release plate 180 slidingly contact the inclined wall surfaces of the cam grooves 144 and 154 of the pawls 140 and 150, and the pawls 140 and 150 retreat in the direction where the outside teeth 141 and 151 of the pawls 140 and 150 move away from the inside teeth 133 of the ratchet plate 130. Consequently, the engagement between the outside teeth 141 and 151 of the pawls 140 and 150 and the inside teeth 133 of the ratchet plate 130 is released, and thus the ratchet plate (seat back) 130 comes to be tilting (unlocked condition).

When the seat back is tilted to a desired angle and an operating force given to the operation shaft 120 is released, the cam 170 presses the rear end surfaces 146 and 156 of the pawls 140 and 150 by the urging forces of the spiral springs 191 and 195. As a result, the outside teeth 141 and 151 of the pawls 140 and 150 are again brought into engagement with the inside teeth 133 of the ratchet plate 130. Then, the reclining device returns to the condition where the rotation of the ratchet plate (seat back) 130 is prevented.

The structure according to the invention offers the following advantages.

(1) The first flat surface 171a of the elliptical hole 171 of the cam 170 is brought into contact with the 1'st flat surface 120a of the operation shaft 120 by the elastic force generating unit 305 (second guide section 323 and spring section 325). Thus, the cam 170 and the operation shaft 120 can be positioned in the direction perpendicular to the first flat surface 171a on the plane parallel with the rotation plane of the cam 170.

The second guide section 323 of the elastic force generating unit 305 contacts the 2'nd flat surface 120b of the operation shaft 120 (outer circumferential surface of the operation shaft 120) with pressure, and the spring section 325 contacts the bottom surface of the second groove 171d of the cam 170 (inner circumferential surface of elliptical hole 171 of cam 170) with pressure. As a result, the first flat surface 171a of the elliptical hole 171 of the cam 170 and the 1'st flat surface 120a of the operation shaft 120 come into contact with each other, and thus the cam 170 and the operation shaft 120 can be positioned in the direction perpendicular to the first flat surface 171a (direction of arrow X in FIG. 15) on the plane parallel with the rotation plane (sheet surface) of the cam 170.

Accordingly, the rotation center axis of the operation shaft 120 coincides with the rotation center axis of the cam 170, and thus maneuverability of the reclining device at the time of operation can be further enhanced.

(2) In the structure in which the spring plate 301 has the holding unit 303, the holding unit 303 of the spring plate 301 is temporarily retained by the operation shaft 120, and then the spring plate 301 is shifted along the operation shaft. Thus, the first guide section 321 can be easily inserted into the first groove 171c of the cam 170, and the second guide section 323 and the spring section 325 (elastic force generating unit 305) can be easily inserted into the second groove 171d of the cam 170.

Similarly to the first embodiment, modifications and changes similar to those in the first embodiment may be given to the second embodiment, and therefore the invention is not limited to the specific examples shown in the second embodiment.

What is claimed is:

1. A reclining device, comprising:
   a base plate;
   a ratchet plate superposed on the base plate such that the ratchet plate is rotatable relative to the base plate;
   an operation shaft rotatably disposed on a rotation center axis of the ratchet plate;
   a circular concavity formed on a surface of the ratchet plate opposed to the base plate around the operation shaft;
   inside teeth provided on an inner circumferential wall surface of the concavity;
   pawls disposed in the concavity and provided with outside teeth on front end surfaces of the pawls, the outside teeth engaging with and disengaging from the inside teeth in a radial direction of a teeth end circle of the inside teeth, the pawls having rear end surfaces;
   guide projections provided on the base plate for slidingly guiding the pawls in the radial direction;
   a cam disposed in a space on the side of rear end surfaces of the pawls and rotatable with the operation shaft to press the rear end surfaces of the pawls;

urging means for urging the cam in the direction where the outside teeth of the pawls engage with the inside teeth of the ratchet plate;

cam grooves formed on the pawls between the outside teeth on front end surfaces of the pawls and the rear end surfaces of the pawls pressed by the cams, the grooves being open at least to the ratchet plate; and a release plate disposed between the ratchet plate and the pawls and the cam such that the release plate is rotatable with the cam, wherein:

projections engagable with the cam grooves of the pawls are integrally formed on a rotation end of the release plate; and when the operation shaft is rotated against an urging force produced by the urging means, the release plate forces the pawls to shift toward a rotation center of the cam by the interaction of the cam grooves of the pawls and the projections of the release plate such that the outside teeth of the pawls are separated from the inside teeth of the ratchet plate.

2. The reclining device according to claim 1, wherein back surfaces of the guide projections on the base plate coincide with a back surface of the base plate.

3. The reclining device according to claim 1, wherein:

the cam has inclined cam surfaces for pressing the rear end surfaces of the pawls such that the outside teeth of the pawls engage with the inside teeth of the ratchet plate at a time of rotation of the cam;

the cam has supporting surfaces which are disposed at least either before or behind the inclined cam surfaces in a direction of rotation of the cam caused by the urging means and are opposed to the ends of the rear end surfaces of the pawls at the time of engagement between the outside teeth of the pawls and the inside teeth of the ratchet plate so as to support the ends of the rear end surfaces of the pawls in the direction of rotation;

the supporting surfaces include first inclined surfaces inclined in the same directions as the directions of the inclined cam surfaces and second inclined surfaces inclined in directions opposite to the directions of the inclined cam surfaces; and first projections capable of contacting the first inclined surfaces and second projections capable of contacting the second inclined surfaces are provided on the ends of the rear end surfaces of the pawls.

4. The reclining device according to claim 3, wherein the shapes of the inclined cam surfaces and the first inclined surfaces of the supporting surfaces of the cam are set so that clearances between the first inclined surfaces of the supporting surfaces of the cam and the first projections of the pawls are kept constant ahead of and in back of the inclined cam surfaces in the direction of rotation of the cam at the engagement positions of the outside teeth of the pawls and the inside teeth of the ratchet plate.

5. The reclining device according to claim 1, wherein cam stopper surfaces are provided on the cam that contact pawl stopper surfaces on the pawls to prevent further rotation of the cam when the outside teeth of the pawls are separated from the inside teeth of the ratchet plate.

6. The reclining device according to claim 1, wherein the projections engagable with the cam grooves of the pawls are integrally formed on an outermost rotation edge of the release plate.

7. A reclining device comprising:

a base plate;

a ratchet plate superposed on the base plate such that the ratchet plate is rotatable relative to the base plate;

an operation shaft rotatably disposed on a rotation center axis of the ratchet plate;

a circular concavity formed on a surface of the ratchet plate opposed to the base plate around the operation shaft;

inside teeth provided on an inner circumferential wall surface of the concavity;

pawls disposed in the concavity and provided with outside teeth on front end surfaces of the pawls, the outside teeth engaging with and disengaging from the inside teeth in a radial direction of a teeth end circle of the inside teeth;

guide projections provided on the base plate for slidingly guiding the pawls in the radial direction;

a cam disposed in a space on the side of rear end surfaces of the pawls and rotatable with the operation shaft to press rear end surfaces of the pawls;

urging means for urging the cam in the direction where the outside teeth of the pawls engage with the inside teeth of the ratchet plate;

cam grooves formed on the pawls and open at least to the ratchet plate; and a release plate disposed between the ratchet plate and the pawls and the cam such that the release plate is rotatable with the cam, wherein:

projections engagable with the cam grooves of the pawls are integrally formed on a rotation end of the release plate;

when the operation shaft is rotated against an urging force produced by the urging means, the release plate forces the pawls to shift toward a rotation center of the cam by the interaction of the cam grooves of the pawls and the projections of the release plate such that the outside teeth of the pawls are separated from the inside teeth of the ratchet plate;

a first flat surface extending in parallel with the rotation center axis of the operation shaft is formed on an outer circumferential surface of the operation shaft;

a through hole larger than the operation shaft through which the operation shaft is inserted is provided on the cam, and a first flat surface which extends in parallel with the rotation center axis of the cam is formed on an inner circumferential surface of the through hole; and an elastic force generating member which contacts the inner circumferential surface of the through hole and the outer circumferential surface of the operation shaft with pressure to bring the first flat surface of the through hole of the cam and the first flat surface of the operation shaft into contact with each other is provided between the inner circumferential surface of the through hole of the cam and the outer circumferential surface of the operation shaft inserted through the through hole.

8. The reclining device according to claim 7, wherein the elastic force generating member includes:

a holding unit attached to an area of the outer circumferential surface of the operation shaft other than a portion opposed to the inner circumferential surface of the through hole of the cam; and an elastic force generating unit disposed next to the holding unit for contacting the inner circumferential surface of the through hole of the cam and the outer circumferential surface of the operation shaft with pressure.

9. The reclining device according to claim 8, wherein:

the through hole of the cam has an elliptical cross section having the first flat surface and a second flat surface parallel with the first flat surface on the inner circumferential surface;

the operation shaft has an elliptical cross section having the first flat surface and a second flat surface parallel with the first flat surface on the outer circumferential surface;

the first flat surface of the cam has a first groove extending along the rotation center axis of the cam, and the second flat surface has a second groove extending along the rotation center axis of the cam;

the holding unit of the elastic force generating member has a base section opposed to a circumferential surface between the first flat surface and the second flat surface of the operation shaft, a first contact section provided next to one end of the base section for contacting the first flat surface of the operation shaft with pressure, and a second contact section provided next to the other end of the base section for contacting the second flat surface of the operation shaft with pressure;

the first contacting section has a first guide projection which is inserted into the first groove and has a shape whose width in the width direction of the first groove is gradually decreased; and the second contacting section has a second guide projection which is inserted into the second groove while contacting the second flat surface of the operation shaft with pressure and has a shape whose width in the width direction of the second groove is gradually decreased, and a spring section which is inserted into the second groove and contacts the bottom surface of the second groove with pressure so as to bring the first flat surface of the through hole of the cam and the first flat surface of the operation shaft into contact with each other in cooperation with the second guide projection.

* * * * *